US 7,509,423 B2

(12) United States Patent
Douceur et al.

(10) Patent No.: US 7,509,423 B2
(45) Date of Patent: Mar. 24, 2009

(54) LOCATING POTENTIALLY IDENTICAL OBJECTS ACROSS MULTIPLE COMPUTERS BASED ON STOCHASTIC PARTITIONING OF WORKLOAD

(75) Inventors: John R. Douceur, Bellevue, WA (US); Marvin M. Theimer, Bellevue, WA (US); Atul Adya, Bellevue, WA (US); William J. Bolosky, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 494 days.

(21) Appl. No.: 10/992,024

(22) Filed: Nov. 18, 2004

(65) Prior Publication Data
US 2005/0071340 A1 Mar. 31, 2005

Related U.S. Application Data

(62) Division of application No. 09/876,376, filed on Jun. 6, 2001, now Pat. No. 6,988,124.

(51) Int. Cl.
*G06F 15/13* (2006.01)
(52) U.S. Cl. .................. 709/226; 703/201; 703/203; 703/217; 703/218; 703/219; 707/200; 707/205
(58) Field of Classification Search .......... 709/201, 709/203, 217, 218, 219, 226; 707/200, 205
See application file for complete search history.

(56) References Cited

U.S. PATENT DOCUMENTS

| | | | |
|---|---|---|---|
| 5,202,982 A | 4/1993 | Gramlich et al. | |
| 5,317,728 A | 5/1994 | Tevis et al. | |
| 5,371,794 A | 12/1994 | Diffie et al. | |
| 5,452,447 A | 9/1995 | Nelson et al. | |
| 5,483,652 A | 1/1996 | Sudama et al. | |
| 5,553,235 A | 9/1996 | Chen et al. | |
| 5,564,037 A | 10/1996 | Lam | |

(Continued)

FOREIGN PATENT DOCUMENTS

EP 0663640 7/1995

(Continued)

OTHER PUBLICATIONS

E. Adar and B. Huberman, "Free Riding on Gnutella," Xerox PARC Technical Report, pp. 1-22, Aug. 2000.

(Continued)

*Primary Examiner*—Jinsong Hu
(74) *Attorney, Agent, or Firm*—Lee & Hayes, PLLC

(57) ABSTRACT

Potentially identical objects (e.g., files) are located across multiple computers based on stochastic partitioning of workload. For each of a plurality of objects stored on a plurality of computers in a network, a portion of object information corresponding to the object is selected. The object information can be generated in a variety of manners (e.g., based on hashing the object, based on characteristics of the object, and so forth). Any of a variety of portions of the object information can be used (e.g., the least significant bits of the object information). A stochastic partitioning process is then used to identify which of the plurality of computers to communicate the object information to for identification of potentially identical objects on the plurality of computers.

17 Claims, 15 Drawing Sheets

U.S. PATENT DOCUMENTS

| | | | |
|---|---|---|---|
| 5,586,330 A | 12/1996 | Knudsen et al. | |
| 5,588,147 A | 12/1996 | Neeman et al. | |
| 5,680,611 A | 10/1997 | Rail et al. | |
| 5,692,178 A | 11/1997 | Shaughnessy | |
| 5,758,359 A | 5/1998 | Saxon | |
| 5,778,395 A | 7/1998 | Whiting et al. | |
| 5,794,042 A | 8/1998 | Terada et al. | |
| 5,812,776 A | 9/1998 | Gifford | |
| 5,873,085 A | 2/1999 | Enoki et al. | |
| 5,901,227 A | 5/1999 | Perlman | |
| 5,907,673 A | 5/1999 | Hirayama et al. | |
| 5,909,540 A | 6/1999 | Carter et al. | |
| 5,913,217 A | 6/1999 | Alger et al. | |
| 5,915,096 A * | 6/1999 | Rosenzweig et al. | 709/227 |
| 5,940,841 A | 8/1999 | Schmuck et al. | |
| 5,950,198 A | 9/1999 | Falls et al. | |
| 5,950,209 A | 9/1999 | Carrier, III et al. | |
| 5,953,729 A | 9/1999 | Cabrera et al. | |
| 5,960,446 A | 9/1999 | Schmuck et al. | |
| 5,963,963 A | 10/1999 | Schmuck et al. | |
| 5,968,121 A * | 10/1999 | Logan et al. | 709/219 |
| 5,974,141 A | 10/1999 | Saito | |
| 5,978,805 A | 11/1999 | Carson | |
| 5,987,477 A | 11/1999 | Schmuck et al. | |
| 5,991,414 A | 11/1999 | Garay et al. | |
| 5,991,771 A | 11/1999 | Falls et al. | |
| 6,023,506 A | 2/2000 | Ote et al. | |
| 6,026,474 A | 2/2000 | Carter et al. | |
| 6,029,168 A | 2/2000 | Frey | |
| 6,032,151 A | 2/2000 | Arnold et al. | |
| 6,032,216 A | 2/2000 | Schmuck et al. | |
| 6,047,283 A | 4/2000 | Braun | |
| 6,067,545 A | 5/2000 | Wolff | |
| 6,098,079 A | 8/2000 | Howard | |
| 6,122,631 A | 9/2000 | Berbec et al. | |
| 6,125,372 A | 9/2000 | White | |
| 6,145,094 A | 11/2000 | Shirriff et al. | |
| 6,160,552 A | 12/2000 | Wilsher et al. | |
| 6,167,449 A | 12/2000 | Arnold et al. | |
| 6,185,569 B1 | 2/2001 | East et al. | |
| 6,185,574 B1 | 2/2001 | Howard et al. | |
| 6,208,659 B1 | 3/2001 | Govindarajan et al. | |
| 6,233,606 B1 | 5/2001 | Dujari | 709/213 |
| 6,240,416 B1 | 5/2001 | Immon et al. | |
| 6,259,723 B1 | 7/2001 | Miyashita | |
| 6,260,040 B1 | 7/2001 | Kauffman et al. | |
| 6,263,348 B1 | 7/2001 | Kathrow et al. | |
| 6,269,080 B1 | 7/2001 | Kumar | |
| 6,295,538 B1 | 9/2001 | Cooper et al. | |
| 6,324,544 B1 | 11/2001 | Alam et al. | |
| 6,345,288 B1 | 2/2002 | Reed et al. | |
| 6,370,547 B1 | 4/2002 | Eftink | |
| 6,389,433 B1 | 5/2002 | Bolosky et al. | |
| 6,405,315 B1 | 6/2002 | Burns et al. | |
| 6,415,280 B1 | 7/2002 | Farber et al. | |
| 6,415,372 B1 | 7/2002 | Zakai et al. | |
| 6,463,535 B1 | 10/2002 | Drews | |
| 6,466,978 B1 | 10/2002 | Mukherjee et al. | |
| 6,477,544 B1 | 11/2002 | Bolosky et al. | |
| 6,484,186 B1 | 11/2002 | Rungta | |
| 6,484,204 B1 | 11/2002 | Rabinovich | |
| 6,493,804 B1 | 12/2002 | Soltis et al. | |
| 6,510,426 B1 | 1/2003 | Cohen et al. | |
| 6,516,350 B1 | 2/2003 | Lumelsky et al. | |
| 6,522,423 B2 | 2/2003 | Cohen et al. | |
| 6,535,894 B1 | 3/2003 | Schmidt et al. | |
| 6,556,998 B1 | 4/2003 | Mukherjee et al. | |
| 6,560,706 B1 | 5/2003 | Carbajal et al. | |
| 6,577,734 B1 | 6/2003 | Etzel et al. | 380/277 |
| 6,671,821 B1 | 12/2003 | Castro et al. | |
| 6,704,730 B2 | 3/2004 | Moulton et al. | |
| 6,711,559 B1 | 3/2004 | Kogota et al. | |
| 6,718,360 B1 | 4/2004 | Jones et al. | |
| 6,721,880 B1 | 4/2004 | Pike | |
| 6,725,373 B2 | 4/2004 | Carbajal et al. | |
| 6,738,797 B1 | 5/2004 | Martin | |
| 6,742,114 B1 | 5/2004 | Carter et al. | |
| 6,748,538 B1 | 6/2004 | Chan et al. | |
| 6,751,627 B2 | 6/2004 | Sternin | |
| 6,766,367 B1 | 7/2004 | Stevenson et al. | |
| 6,788,769 B1 | 9/2004 | Waites | |
| 6,928,426 B2 | 8/2005 | Dake | |
| 6,947,556 B1 | 9/2005 | Matyas, Jr. et al. | |
| 6,952,737 B1 * | 10/2005 | Coates et al. | 709/229 |
| 6,988,124 B2 | 1/2006 | Douceur et al. | |
| 6,990,578 B1 | 1/2006 | O'Brien et al. | |
| 6,993,653 B1 | 1/2006 | Guski et al. | |
| 6,996,714 B1 | 2/2006 | Halasz et al. | |
| 7,000,141 B1 | 2/2006 | Karlsson et al. | |
| 7,010,689 B1 | 3/2006 | Matyas, Jr. et al. | |
| 7,043,637 B2 | 5/2006 | Bolosky et al. | |
| 7,051,028 B2 | 5/2006 | Shi et al. | |
| 7,146,377 B2 | 12/2006 | Nowicki et al. | |
| 7,152,165 B1 | 12/2006 | Maheshwari et al. | |
| 7,249,382 B2 | 7/2007 | Kawell, Jr. et al. | |
| 7,272,630 B2 | 9/2007 | Douceur et al. | |
| 2002/0016174 A1 | 2/2002 | Gibson et al. | |
| 2002/0038296 A1 | 3/2002 | Margolus et al. | |
| 2002/0066022 A1 | 5/2002 | Calder et al. | |
| 2002/0073082 A1 | 6/2002 | Duvillier et al. | |
| 2002/0088011 A1 | 7/2002 | Lamkin et al. | 725/142 |
| 2002/0095590 A1 | 7/2002 | Douceur et al. | 713/190 |
| 2002/0097878 A1 | 7/2002 | Ito et al. | |
| 2002/0099784 A1 | 7/2002 | Tran | |
| 2002/0103818 A1 | 8/2002 | Amberden | |
| 2002/0111996 A1 | 8/2002 | Jones et al. | |
| 2003/0046533 A1 | 3/2003 | Olkin et al. | 713/152 |
| 2003/0135586 A1 | 7/2003 | Minborg et al. | |
| 2004/0068652 A1 | 4/2004 | Carpentier et al. | |
| 2004/0111608 A1 | 6/2004 | Oom Temudo de Castro et al. | |
| 2004/0143743 A1 | 7/2004 | Margolus et al. | |
| 2004/0143744 A1 | 7/2004 | Margolus et al. | |
| 2004/0162808 A1 | 8/2004 | Margolus et al. | |
| 2004/0249902 A1 | 12/2004 | Tadayon et al. | |
| 2005/0071315 A1 | 3/2005 | Douceur et al. | |
| 2005/0071330 A1 | 3/2005 | Douceur et al. | |
| 2005/0071339 A1 | 3/2005 | Douceur et al. | |
| 2005/0071340 A1 | 3/2005 | Douceur et al. | |
| 2005/0131903 A1 | 6/2005 | Margolus et al. | |
| 2005/0131961 A1 | 6/2005 | Margolus et al. | |
| 2005/0172124 A1 | 8/2005 | Carpentier et al. | |
| 2005/0222994 A1 | 10/2005 | Douceur et al. | |
| 2005/0246393 A1 * | 11/2005 | Coates et al. | 707/200 |
| 2006/0129807 A1 | 6/2006 | Halasz et al. | |

FOREIGN PATENT DOCUMENTS

EP 1052805 11/2000

OTHER PUBLICATIONS

R. Anderson, "The Eternity Service," Prago-Crypt, pp. 242-252, Oct. 1996.

T. Anderson, M. Dahlin, J. Neefe, D. Patterson, D. Roselli, and R. Wang, "Serverless Network File Systems," 15th Symposium on Operating Systems Principles, pp. 109-126, Dec. 1995.

W. Bolosky, J. Douceur, D. Ely, M. Theimer, "Feasibility of a Serverless Distributed File System Deployed on an Existing Set of Desktop PCs", Proceedings of the International Conference on Measurement and Modeling of Computer Systems, pp. 34-43, Jun. 17-21, 2000.

W. Bolosky, S. Corbin, D. Goebel, and J. Douceur, "Single Instance Storage in Windows® 2000," Proceedings of the 4th Usenix Windows Systems Symposium, pp. 13-24, Aug. 2000.

G. Cabri, A. Corradi, F. Zambonelli, "Experience of Adaptive Replication in Distributed File Systems", 22nd IEEE Euromicro, 10 pages, Sep. 1996.

M. Castro and B. Liskov, "Practical Byzantine Fault Tolerance," Proceedings of the Third Symposium on Operating Systems Design and Implementation, 14 pages, Feb. 1999.

M. Castro and B. Liskov, "Proactive Recovery in a Byzantine-Fault-Tolerant System," 4th Symposium on Operating Systems Design and Implementation, pp. 273-287, Oct. 2000.

I. Clarke, O. Sandberg, B. Wiley, and T. Hong, "Freenet: A Distributed Anonymous Information Storage and Retrieval System," ICSI Workshop on Design Issues in Anonymity and Unobservability, 21 pages, Jul. 2000.

J. Douceur and W. Bolosky, "A Large-Scale Study of File-System Contents," Sigmetrics, pp. 59-70, May 1999.

L. Fan, P. Cao, J. Almeida, and A. Broder, "Summary Cache: A Scalable Wide-Area Web Cache Sharing Protocol", ACM Sigcomm, pp. 254-265, 1998.

A. Goldberg and P. Ylanilos, "Towards an Archival Intermemory," IEEE International Forum on Research and Technology Advances in Digital Libraries, pp. 147-156, Apr. 1998.

J. Howard, M. Kazar, S. Menees, D. Nichols, M. Satyanarayanan, R. Sidebotham, and M. West, "Scale and Performance in a Distributed File System," ACM Transactions on Computer Systems, pp. 51-81, Feb. 1988.

J. Kistler and M. Satyanarayanan, "Disconnected Operation in the Coda File System," ACM Transactions on Computer Systems, vol. 10, No. 1, pp. 3-25, Feb. 1992.

J. Kubiatowicz et al., "OceanStore: An Architecture for Global-Scale Persistent Storage," Proceedings of the Ninth International Conference on Architectural Support for Programming Languages and Operating Systems, 12 pages, Nov. 2000.

E. Lee and C. Thekkath, "Petal: Distributed Virtual Disks," Seventh International Conference on Architectural Support for Programming Languages and Operating Systems, pp. 84-92, Oct. 1996.

D. Mazières, M. Kaminsky, M. F. Kaashoek, and E. Witchel, "Separating Key Management from File System Security", 17th ACM Symposium on Operating Systems Principles, pp. 124-139, Dec. 1999.

D.L. McCue, M.C. Little, "Computing Replica Placement in Distributed Systems", IEEE Second Workshop on Replicated Data, pp. 58-61, Nov. 1992.

M. K. McKusick, W. N. Joy, S. J. Leffler, and R. S. Fabry, "A Fast File System for Unix," ACM Transactions on Computer Systems, vol. 2, No. 3, pp. 181-197, Aug. 1984.

The OceanStore Project web pages, http://oceanstore.cs.berkeley.edu/info/overview.html, 2 pages, last modified Jul. 8, 2002.

C. Plaxton, R. Rajaraman, and A Richa, "Accessing Nearby Copies of Replicated Objects in a Distributed Environment", Proceedings of the 9th Annual ACM Symposium on Parallel Algorithms and Architectures, pp. 311-320, 1997.

C. Plaxton, R. Rajaraman, and A Richa, "Accessing Nearby Copies of Replicated Objects in a Distributed Environment", Theory of Computing Systems, pp. 32:241-280, 1999.

R. T. Reich and D. Albee, "S.M.A.R.T. Phase-II," No. WP-9803-001, Maxtor Corporation, 3 pages, Feb. 1998.

J. D. Saltzer and M. D. Schroeder. "The Protection of Information in Computer Systems," Proceedings of the IEEE 63(9), pp. 1278-1308, Sep. 1975.

R. Sandberg, D. Goldberg, S. Kleiman, D. Walsh, and B. Lyon, "Design and Implementation of the Sun Network Filesystem," Summer USENIX Conference, pp. 119-130, Jun. 1985.

A. Sweeny, D. Doucette, W. Hu, C. Anderson, M. Nishimoto, and G. Peck, "Scalability in the XFS File System," USENIX Annual Technical Conference, 15 pages, 1996.

C. Thekkath, T. Mann, and E. Lee, "Frangipani: A Scalable Distributed File System," 16th ACM Symposium on Operating Systems Principles, pp. 224-237, 1997.

W. Vogels, "File system usage in Windows NT 4.0," 17th ACM Symposium on Operating Systems Principles, pp. 93-109, Dec. 1999.

J. Wylie, M. Bigrigg, J. Strunk, G. Ganger, H. Kiliççöte, and P. Khosla, "Survivable Information Storage Systems," IEEE Computer, pp. 33(8):61-68, Aug. 2000.

Evans, Matt, "FTFS: The Design of A Fault Tolerant Distributed File-System," May 2000, pp. 1-49.

Cheriton, David R. and Mann, Timothy P., "Decentralizing a Global Naming Service for Improved Performance and Fault Tolerance," ACM Transactions on Computer Systems, vol. 7, No. 2, May 1989, pp. 147-183.

ISU: http://.isu.edu/departments/comcom/unix/workshop/shell.html, "Section 4: The UNIX Shell", 3 pages, no date.

From the Internet: http://.isu.edu/departments/comcom/unix.workshop/, retrieved Sep. 28, 2005.

Federal Information Processing Standards Publication 186: Digital Signature Standard (DSS). 1994.

Borg, Digital Signatures Keep Cyberstreets Safe for Shoppers, Computer Technology Review, vol. 16, No. 2, Feb. 1996 p. 1.

Hu, Some Thoughts on Agent Trust and Delegation, Available at http://www.cs.nccu.edu.tw/jong, 2001, pp. 489-496.

Miller et al, "Strong Security for Distributed File Systems", 2001 IEEE, pp. 34-40.

Ferbrache, "A Pathology of Computer Viruses", Springer-Verlag, 1992, pp. 6.

European Search Report For European Patent Application No. 02005657.8 Mailed On Nov. 13, 2007 pp. 9.

Coulouris et al., Translated by Tadanori et al., Distributed Systems:, Japan, Denkishoin Co., Ltd., Second Edition, Oct. 31, 2007, pp. 785-827.

* cited by examiner

350

LOCATING POTENTIALLY IDENTICAL OBJECTS ACROSS MULTIPLE COMPUTERS BASED ON STOCHASTIC PARTITIONING OF WORKLOAD

RELATED APPLICATIONS

This application is a divisional application of U.S. patent application Ser. No. 09/876,376, filed Jun. 6, 2001, entitled "Locating Potentially Identical Objects Across Multiple Computers Based On Stochastic Partitioning Of Workload", which is hereby incorporated by reference herein.

TECHNICAL FIELD

This invention relates to computer networks and file systems, and more particularly to locating potentially identical files across multiple computers based on stochastic partitioning of workload.

BACKGROUND OF THE INVENTION

File systems manage files and other data objects stored on computer systems. File systems were originally built into the computer operating system to us facilitate access to files stored locally on resident storage media. As personal computers became networked, some file storage capabilities were offloaded from individual user machines to special storage servers that stored large numbers of files on behalf of the user machines. When a file was needed, the user machine simply requested the file from the server. In this server-based architecture, the file system is extended to facilitate management of and access to files stored remotely at the storage server over a network.

One problem that arises in distributed file systems concerns storage of identical files on the servers. While some file duplication normally occurs on an individual user's personal computer, duplication unfortunately tends to be quite prevalent on networks where servers centrally store the contents of multiple personal computers. For example, with a remote boot facility on a computer network, each user boots from that user's private directory on a file server. Each private directory thus ordinarily includes a number of files that are identical to files on other users' directories. Storing the private directories on traditional file systems consumes a great amount of disk and server file buffer cache space. From a storage management perspective, it is desirable to reduce file duplication to reduce the amount of wasted storage space used to store redundant files. However, any such efforts need to be reconciled with the file system that tracks the multiple duplicated files on behalf of the associated users.

To address the problems associated with storing multiple identical files on a computer, Microsoft developed a single instance store (SIS) system that is packaged as part of the Windows 2000 operating system. The SIS system reduces file duplication by automatically identifying common identical files of a file system, and then merging the files into a single instance of the data. One or more logically separate links are then attached to the single instance to represent the original files to the user machines. In this way, the storage impact of duplicate files on a computer system is greatly reduced.

Today, file storage is migrating toward a model in which files are stored on various networked computers, rather than on a central storage server. However, the problem of duplicate identical files remains, except that the duplicate files are spread out over the various networked computers. Given the large number of computers that can currently be networked together (easily into the thousands or hundreds of thousands), and the large number of files that can exist spread out over this large number of computers (easily into the millions or billions), detecting duplicate files in such an environment can be very difficult. Limitations on the bandwidth available to transfer information among the computers, as well as limitations on the computational capacity of the computers themselves, makes such detections very difficult.

The invention addresses these problems, allowing locating of potentially identical objects, such as files, across multiple computers.

SUMMARY OF THE INVENTION

Locating potentially identical objects across multiple computers based on stochastic partitioning of workload is described herein.

In accordance with one aspect, identical objects (e.g., files) are located across multiple computers by selecting, for each of a plurality of objects stored on a plurality of computers in a network, a portion of object information corresponding to the object. The object information can be generated in a variety of manners (e.g., based on hashing the object, based on characteristics of the is Object, and so forth). Any of a variety of portions of the object information can be used (e.g., the least significant bits of the object information). A stochastic partitioning process is then used to identify which of the plurality of computers to communicate the object information to for identification of potentially identical objects on the plurality of computers.

According to another aspect, the stochastic partitioning process comprises a fully distributed stochastic partitioning process including in which, for each of a plurality of computers, the selected portion of the object information is compared to a portion of a computer identifier associated with the computer. An identification is then made as to which of the computer identifiers have portions matching the selected portion of the object information, and the object information is communicated to each of the computers associated with a computer identifier having a portion matching the selected portion of the object information.

According to another aspect, the stochastic partitioning process comprises a group-based system using directory services process in which an object information portion to computer mapping is accessed on a remote computer. Based on the selected portion of the object information and the remotely accessed mapping, one or more computers are identified to receive the object information.

According to another aspect, the stochastic partitioning process comprises a stochastic partitioning process comprises a multi-level stochastic partitioning process in which selected ones of the plurality of computers in the network are grouped into a plurality of groups based at least in part on the number of the plurality of computers in the network that the computer using the stochastic partitioning process is aware of. Which of the selected ones of the plurality of computers to communicate the object information to is then identified, wherein the identifying is based at least in part on comparing the selected portion of the object information to a portion of a computer identifier of one or more of the selected ones of the plurality of computers.

BRIEF DESCRIPTION OF THE DRAWINGS

The present invention is illustrated by way of example and not limitation in the figures of the accompanying drawings.

The same numbers are used throughout the figures to reference like components and/or features.

DETAILED DESCRIPTION

The discussions herein assume a basic understanding of cryptography by the reader. For a basic introduction of cryptography, the reader is directed to a text written by Bruce Schneier and entitled "Applied Cryptography: Protocols, Algorithms, and Source Code in C," published by John Wiley & Sons with copyright 1994 (or second edition with copyright 1996).

Operating Environment

The following discussion is directed primarily to locating identical files across multiple computers in a distributed file system. The file system is described in the context of a symbiotic, serverless, distributed file system that runs on multiple networked computers and stores files across the computers rather than on a central server or cluster of servers. The symbiotic nature implies that the machines cooperate but do not completely trust one another. The file system does not manage the storage disk directly, but rather relies on existing file systems on local machines, such as those file systems integrated into operating systems (e.g., the Windows NT® file system).

While the file system is described in the context of storing "files", it should be noted that other types of storable data can be stored in the file system. The term "file" is used for discussion purposes and is intended to include data objects or essentially any other storage subject matter that may not be commonly characterized as a "file".

Additionally, the systems and methods described herein are also applicable to data in other types of systems other than file systems, such as database systems or object systems. The methods and systems described herein operate on objects containing bytes (these objects being predominately described herein as files), and can be used to identify potentially duplicate objects including any object data or meta data. Furthermore, the methods and systems described herein may also operate on object-defined methods rather than acting upon the objects at the byte level, including methods defined on objects for obtaining the bytes (e.g., file information) described herein.

Figure 1:
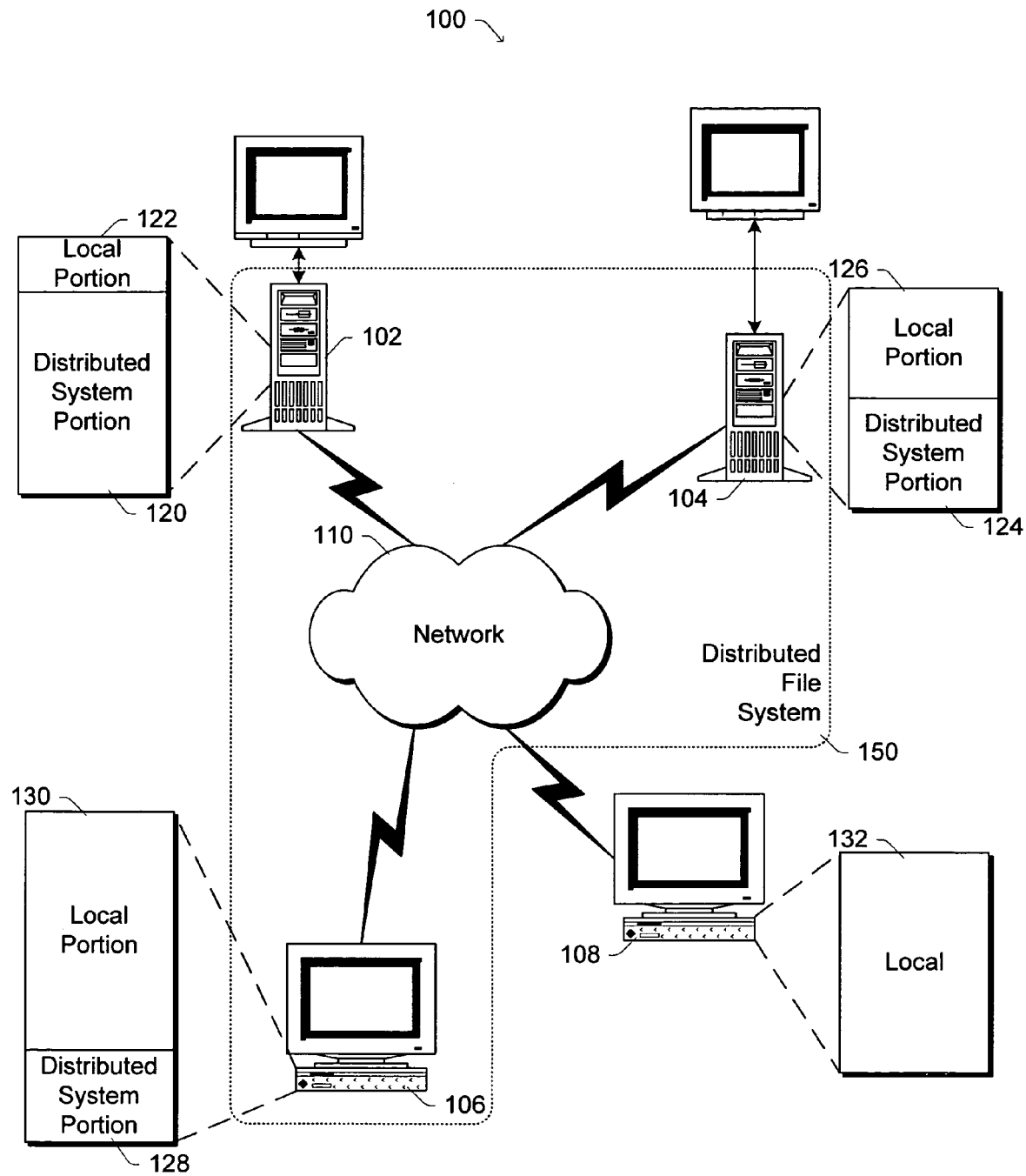
FIG. 1 illustrates an exemplary network environment that supports a serverless distributed file system.

FIG. 1 illustrates an exemplary network environment 100 that supports a serverless distributed file system. Four client computing devices 102, 104, 106, and 108 are coupled together via a data communications network 110. Although four computing devices are illustrated, different numbers (either greater or fewer than four) may be included in network environment 100.

Network 110 represents any of a wide variety of data communications networks. Network 110 may include public portions (e.g., the Internet) as well as private portions (e.g., an internal corporate Local Area Network (LAN)), as well as combinations of public and private portions. Network 110 may be implemented using any one or more of a wide variety of conventional communications media including both wired and wireless media. Any of a wide variety of communications protocols can be used to communicate data via network 110, including both public and proprietary protocols. Examples of such protocols include TCP/IP, IPX/SPX, NetBEUI, etc.

Computing devices 102-108 represent any of a wide range of computing devices, and each device may be the same or different. By way of example, devices 102-108 may be desktop computers, laptop computers, handheld or pocket computers, personal digital assistants (PDAs), cellular phones, Internet appliances, consumer electronics devices, gaming consoles, and so forth.

Two or more of devices 102-108 operate to implement a serverless distributed file system (although some of them may not be operational (e.g., failed or powered-down) at any given time). The actual devices included in the serverless distributed file system can change over time, allowing new devices to be added to the system and other devices to be removed from the system. Each device 102-108 that is part of the distributed file system has different portions of its mass storage device(s) (e.g., hard disk drive) allocated for use as either local storage or distributed storage. The local storage is used for data that the user desires to store on his or her local machine and not in the distributed file system structure. The distributed storage portion is used for data that the user of the device (or another device) desires to store within the distributed file system structure.

In the illustrated example of FIG. 1, certain devices connected to network 110 have one or more mass storage devices that include both a portion used by the local machine and a portion used by the distributed file system. The amount allocated to distributed or local storage varies among the devices and can vary over time. For example, device 102 has a larger percentage allocated for a distributed system portion 120 in comparison to the local portion 122; device 104 includes a distributed system portion 124 that is approximately the same size as the local portion 126; and device 106 has a smaller percentage allocated for a distributed system portion 128 in comparison to the local portion 130. The storage separation into multiple portions may occur on a per storage device basis (e.g., one hard drive is designated for use in the distributed system while another is designated solely for local use), and/or within a single storage device (e.g., part of one hard drive may be designated for use in the distributed system while another part is designated for local use). Other devices connected to network 110, such as computing device 108, may not be part of the distributed file system and thus such devices do not have any of their mass storage device(s) allocated for use by the distributed system. Hence, device 108 has only a local portion 132.

A distributed file system 150 operates to store one or more copies of files on different computing devices 102-106. When a new file is created by the user of a computer, he or she has the option of storing the file on the local portion of his or her computing device, or alternatively in the distributed file system. If the file is stored in the distributed file system 150, the file will be stored in the distributed system portion of the mass storage device(s) of one or more of devices 102-106. The user creating the file typically has no ability to control which device 102-106 the file is stored on, nor any knowledge of which device 102-106 the file is stored on. Additionally, replicated copies of the file will typically be saved, allowing the user to subsequently retrieve the file even if one of the computing devices 102-106 on which the file is saved is unavailable (e.g., is powered-down, is malfunctioning, etc.).

The distributed file system 150 is implemented by one or more components on each of the devices 102-106, thereby obviating the need for any centralized server to coordinate the file system. These components operate to determine where particular files are stored, how many copies of the files are created for storage on different devices, and so forth. Exactly which device will store which files depends on numerous factors, including the number of devices in the distributed file system, the storage space allocated to the file system from each of the devices, how many copies of the file are to be saved, the number of files already stored on the devices, and so on. Thus, the distributed file system allows the user to create and access files (as well as folders or directories) without any knowledge of exactly which other computing device(s) the file is being stored on.

The files stored by the file system are distributed among the various devices 102-106 and stored in encrypted form. When a new file is created, the device on which the file is being created encrypts the file prior to communicating the file to other device(s) for storage. The directory entry (e.g., the file name) for a new file is also communicated to the other device(s) for storage. Additionally, if a new folder or directory is created, the directory entry (e.g., folder name or directory name) is also communicated to the other device(s) for storage. As used herein, a directory entry refers to any entry that can be added to a file system directory, including both file names and directory (or folder) names.

The distributed file system 150 is designed to prevent unauthorized users from reading data stored on one of the devices 102-106. Thus, a file created by device 102 and stored on device 104 is not readable by the user of device 104 (unless he or she is authorized to do so). In order to implement such security, the contents of files as well as all directory entries are encrypted, and only authorized users are given the decryption key. Thus, although device 104 may store a file created by device 102, if the user of device 104 is not an authorized user of the file, the user of device 104 cannot decrypt (and thus cannot read) either the contents of the file or its directory entry (e.g., filename).

Figure 2:
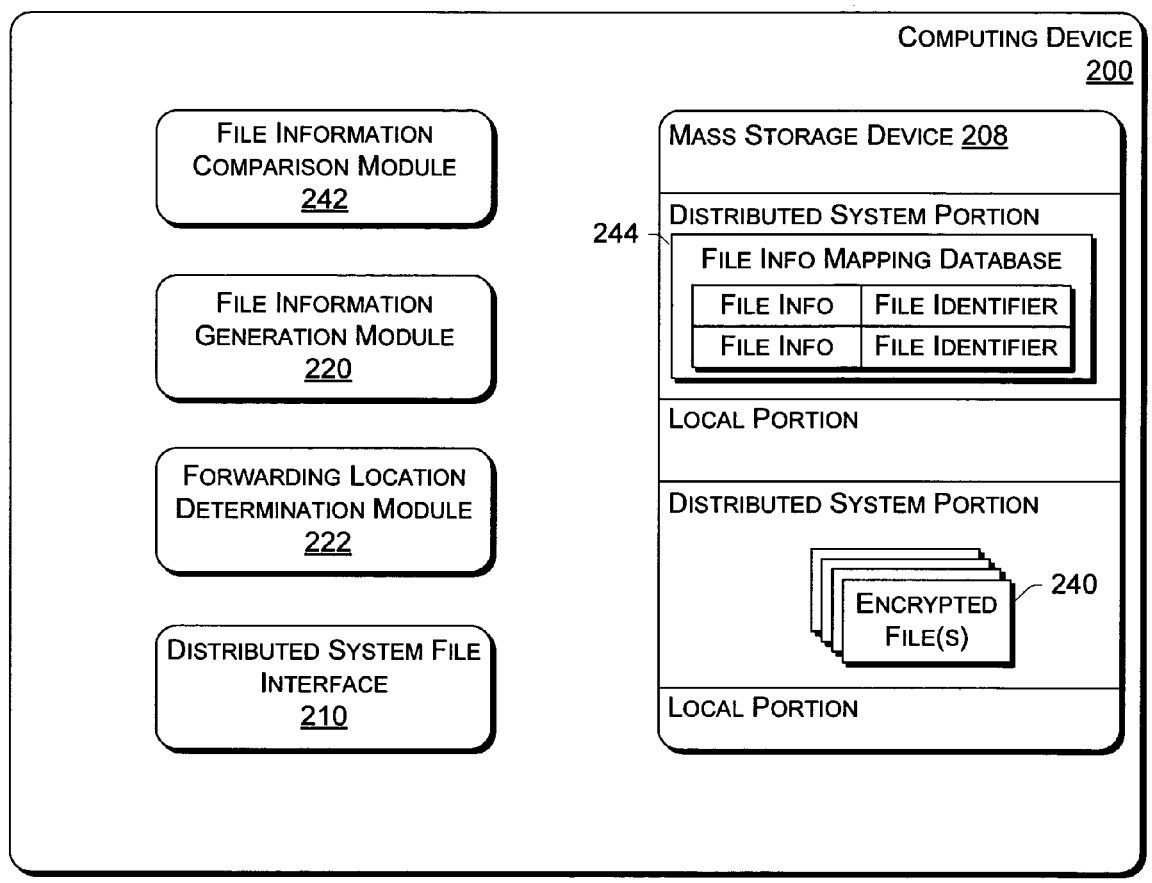
FIG. 2 illustrates logical components of an exemplary computing device that is representative of any one of the devices of FIG. 1 that participate in the distributed file system.

FIG. 2 illustrates logical components of an exemplary computing device 200 (also referred to herein as a computer or machine) that is representative of any one of the devices 102-106 of FIG. 1 that participate in the distributed file system 150. Computing device 200 includes a mass storage device 208, a distributed file system interface 210, and various additional modules providing client and/or server functionality. Computing device 200 also typically includes additional components (e.g., a processor), however these additional components have not been shown in FIG. 2 so as not to clutter the drawings. A more general description of a computer architecture with various hardware and software components is described below with reference to FIG. 15.

Mass storage device 208 can be any of a wide variety of conventional nonvolatile storage devices, such as a magnetic disk, optical disk, Flash memory, and so forth. Mass storage device 208 is separated into a distributed system portion and a local portion; this separation may change over time.

Computing device 200 is intended to be used in a serverless distributed file system, and as such includes modules oriented towards both server functionality and client functionality. The server functionality comes into play when device 200 is responding to a request involving a file or directory entry stored (or to be stored) in storage device 208, as well as when identifying potentially identical or duplicate files. The client functionality, on the other hand, comes into play when issuing requests by device 200 for files stored (or to be stored) in the distributed file system, as well as generating and forwarding file information for file duplication identification as necessary. The client and server functionality operate independent of one another. Thus, situations can arise where the serverless distributed file system 150 causes files being stored by modules operating in a client capacity to be stored in mass storage device 208 by other modules operating in a server capacity.

Computing device 200 includes a file information generation module 220, a forwarding location determination module 222, and a file information comparison module 242. It should be noted, however, that not all components are necessarily needed on each computing device 200. For example, a computing device operating as a client-only machine might not include file information comparison module 242, or a computing device operating as a server-only machine might not include file information generation module 220.

File information generation module 220 generates file information for one or more of encrypted files 240 in storage device 208. Forwarding location determination module 222 determines the location (e.g., one or more other computing devices 200) where the file information generated by module 222 is to be communicated. These components and their operation are described in more detail below.

Although illustrated on a single computing device in FIG. 2, file information generation module 220 and forwarding location determination module 222 may also be implemented across multiple computing devices. For example, in the distributed file system environment illustrated in FIG. 1, a computing device may create or update a file for storage in distributed file system 150, and then communicate the file to another device(s) in distributed file system 150 acting as a directory server. The directory server then stores the file on an appropriate computing device (based on the rules followed by distributed file system 150) and maintains a record of where the file is stored. In this example, the computing device creating or updating the file generates the file information (via its file information generation module 220), while the computing device acting as the directory server (and thus which knows what other computing device the file is stored at) determines the location where the generated file information is to be communicated (via its forwarding location determination module 222).

File information generation module 220 generates file information for one or more encrypted files 240. The file information for each file is a semi-unique value based on the data in the file itself (the data may be program instructions, program data, etc.) and/or other characteristics of the file. The value is a semi-unique value because it is based on the data in the file but is not completely representative of the file. For example, the file information may be a hash value that is based on the data in the file, but it is possible for two different files having different data to have the same hash value. Different characteristics of the file can also be incorporated into the file information, such as the file size, the file type, the file name, and so forth. The file information can be generated in any of a wide variety of manners, so long as each of the computing devices generates its file information in the same manner. Two files that have different file information are not duplicate files. Two files that have the same file information, however, may or may not be duplicate files.

In one implementation, the file information is a hash value generated based on the file. The hash value may be generated using a one-way hashing function (e.g., SHA, MD5, etc.), or any of a variety of other public or proprietary hashing functions. The hash value may be based on the entire file, or alternatively only a portion of the file (e.g., the beginning of the file, the end of the file, the middle of the file, and so forth). In another implementation, the file information is referred to as a file signature, which is a combination of a hash value based on the file (the hash value represents 64 bits of the file signature) and the file size (which represents another 64 bits of the file signature). The file size is used because two files with differing file sizes cannot be identical.

In certain embodiments, the file information is based on a hash value corresponding to the file. This hash value is based on both block-by-block encryption and convergent encryption (as described below), and is generated by the file system for secure storage of files in the distributed computing environment. Thus, in these embodiments, file information generation module 220 need only access the hash value already generated for a file for secure storage in order to generate the file information.

Generally, according to convergent encryption, a file F (or any other type of encryptable object) is initially hashed using a one-way hashing function h (e.g., SHA, MD5, etc.) to produce a hash value h(F). The file F is then encrypted using a symmetric cipher (e.g., RC4, RC2, etc.) with the hash value as the key, or $E_{h(F)}(F)$. Next, read access control entries are created for each authorized user who is granted read access to the encrypted file. The access control entries are formed by encrypting the file's hash value h(F) with any number of keys $K_1, K_2, \ldots, K_m$, to yield $E_{K1}(h(F)), E_{K2}(h(F)), \ldots, E_{Km}(h(F))$. The keys K are randomly generated and uniquely assigned to individual users. In one implementation, each key K is the user's public key of a public/private key pair. In the illustrated example, write access control is governed by the directory server that stores the directory entry for the file and it is thus not addressed by the file format (so references to "access" within this document refer to read access unless specifically identified as another type of access). Alternatively, write access control could be implemented via access control entries in a manner analogous to the read access control discussed herein.

With convergent encryption, one encrypted version of the file is stored and replicated among the serverless distributed file system 150. Along with the encrypted version of the file is stored one or more access control entries depending upon the number of authorized users who have access. Thus, a file in the distributed file system 150 has the following structure:

$$[E_{h(F)}(F), <E_{K1}(h(F))>, <E_{K2}(h(F))>, \ldots, <E_{Km}(h(F))>]$$

One advantage of convergent encryption is that the encrypted file can be evaluated by the file system to determine whether it is identical to another file without resorting to any decryption (and hence, without knowledge of any encryption keys). Unwanted duplicative files can be removed by adding the authorized user(s) access control entries to the remaining file. Another advantage is that the access control entries are very small in size, on the order of bytes as compared to possibly gigabytes for the encrypted file. As a result, the amount of overhead information that is stored in each file is reduced. This enables the property that the total space used to store the file is proportional to the space that is required to store a single encrypted file, plus a constant amount of storage for each additional authorized reader of the file.

For more information on convergent encryption, the reader is directed to co-pending U.S. patent application Ser. No. 09/565,821, entitled "Encryption Systems and Methods for Identifying and Coalescing Identical Objects Encrypted with Different Keys", which was filed May 5, 2000, in the names of Douceur et al., and is commonly assigned to Microsoft Corporation. This application is hereby incorporated by reference.

For small files, the entire file is hashed and encrypted using convergent encryption, and the resulting hash value is used as the encryption key. The encrypted file can be verified without knowledge of the key or any need to decrypt the file first. For large files, the file contents are broken into smaller blocks and then convergent encryption is applied separately to each block. For example, the file F may be segmented into "n" pages $F^0$-$F^{n-1}$, where each page is a fixed size (e.g., a 4Kbyte size). Convergent encryption is then applied to the file at the block level. That is, each block $F^i$ is separately hashed using a one-way hash function (e.g., SHA, MD5, etc.) to produce a hash value $h(F^i)$. Each block $F^i$ is then encrypted using a symmetric cipher (e.g., RC4, RC2, etc.) with the hash value $h(F^i)$ as the key, or $E_{h(Fi)}(F^i)$, resulting in an array of encrypted blocks which form the contents of the file. For more information on block-by-block encryption, the reader is directed to co-pending U.S. patent application Ser. No. 09/814,259 entitled "On-Disk File Format for Serverless Distributed File System", Attorney Docket No. MS1-733US, to inventors William J. Bolosky, Gerald Cermak, Atul Adya, and John R. Douceur. This application is hereby incorporated by reference.

File information generation module 220 can generate the file information at any of a wide variety of times. In one implementation, module 220 is designed to operate as a background process. When files are created or modified, the file names are added to a queue to be acted on by module 220. When computing device 200 is not busy (e.g., the processor has free cycles, or has been idle for a period of time), module 220 operates to generate file information for one of the files in the queue. Alternatively, module 220 may be designed to run at times of anticipated low usage (e.g., at night or early morning), or module 220 may generate the file information for a file whenever that file is created or modified.

Module 220 may generate file information for each encrypted file 240, or alternatively only for selected files 240. In one implementation, module 220 generates file information only for files greater than a threshold size (e.g., files that are at least 16k bytes). This threshold size is implemented to account for the situation where the overhead necessary to identify and coalesce duplicate files that are very small is deemed to be too great in light of the small amount of storage space (due to the small file size) that could be recovered.

The file duplication identification described herein is described primarily with reference to files 240 stored in the distributed system portion(s) of storage device 208. Alternatively, the file duplication identification could also be applied to files stored in the local portion(s) of storage device 208.

Forwarding location determination module 222 receives the file information from file information generation module 220 and forwards the file information to one or more other computing devices 200. Which other computing devices the file information is forwarded to can vary, and is discussed in more detail below with respect to the various implementations.

Additionally, it is not uncommon for files to be deleted from computing device 200. For example, the user may decide he or she no longer desires to run any programs that use a particular file (and uninstalls the program from the computing device), or the user no longer desires to keep a document file he or she created, etc. In these situations, a component of computing device 200 (e.g., distributed system file interface 210) forwards an indication to one or more other computing devices 200 that the file has been deleted from computing device 200. The other computing devices 200 that this indication is communicated to include the same computing devices that file information generation module 220 previously determined the file identifier should be sent to, thereby allowing those devices to remove the file information entry from their respective databases.

The file information generated by a computing device is communicated to one or more computing devices referred to herein as database servers. Each database server maintains a database of file information that it receives and compares the received file information to identify any file information for two files that is the same (and thus indicative of potentially identical files). The database servers may be dedicated database servers (e.g., storing only file information), or alternatively may be other computing devices 200 in the network, storing both received file information as well as other files 240 in the distributed system portion(s) of their storage devices 208.

In a database server, file identification comparison module 242 receives file information and a corresponding file identifier (e.g., filename) from one or more other computing devices 200. Module 242 manages a database 244 (e.g., stored on device 208) of the file information it receives. Database 244 maintains a mapping of the file information to the file identifier. Database 244 may also maintain an indication of the computing device on which the file corresponding to the received file information is stored (or alternatively this may be inherent in the file identifier, which may include a filename as well as directory path to locate the file). Alternatively, the file identifier may not be stored (so long as the computer at which the file corresponding to the file information is stored is maintained in the database or otherwise known, the file information can be returned to that computer as an identification of the file). As discussed herein, the transferring of file information from one computing device to another also typically encompasses transferring the file identifier as well.

Module 242 also compares the received file information to determine whether any of the previously received file information matches (e.g., whether two or more are the same). In one implementation, each time file information is received at the database server, module 242 compares the received file information to the database of file information 244 to determine whether a match exists.

If module 242 detects a file information match, then appropriate action is taken to move one or more of the files corresponding to the matching file information to the same computing device. Once the files corresponding to the matching file information are on the same computing device, the SIS component on that computing device is invoked to determine whether in fact the two files are identical, and if so then to delete one of the files and set up a pointer to the other file in its place. Module 242 can be responsible for moving files as necessary so that they are located on the same device, or alternatively this responsibility may be carried by the computing devices on which the potentially identical files are stored.

The copying of files to the same computer can be carried out in any of a wide variety of manners. In one implementation, module 242 forwards a command to one of the computers storing one of the files corresponding to the matching file information to relocate its file to the computer on which the other file corresponding to the matching file information is located. In another implementation, module 242 forwards the matching file information to the computing devices from which the matching file information were received, along with an indication that the match was identified. The individual computing devices then coordinate with one another to transfer one of the files to the other computing device.

Figure 3:
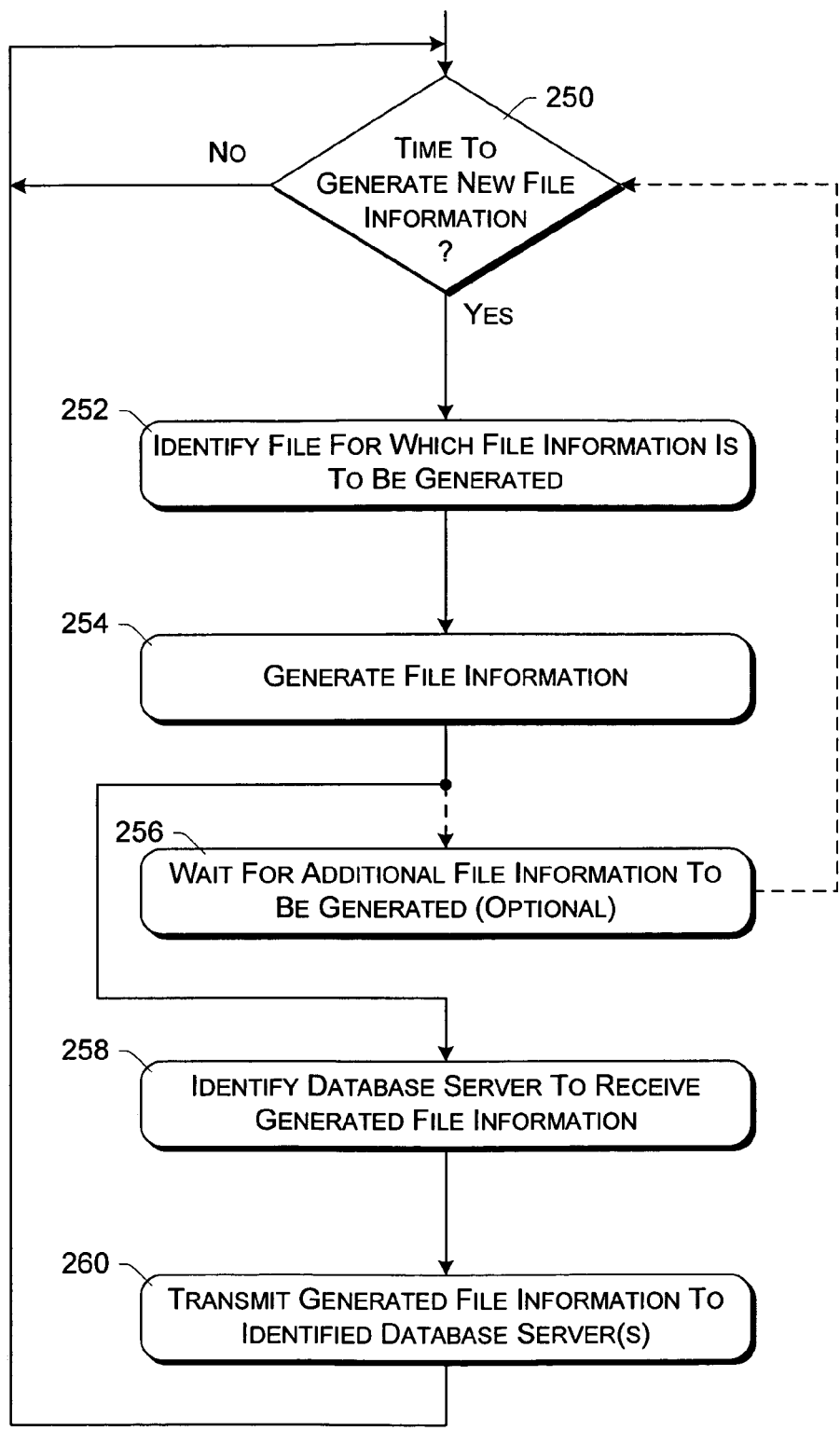
FIG. 3 is a flowchart illustrating an exemplary process followed to inform database servers of the file information in accordance with certain embodiments of the invention.

FIG. 3 is a flowchart illustrating an exemplary process followed to inform database servers of the file information in accordance with certain embodiments of the invention. The process of FIG. 3 is carried out by a computing device 200 of FIG. 2, and may be implemented in software.

Initially, the process waits until it is time to generate new file information for a file (act 250). Once it is time to generate new file information, the file for which the file information is to be generated is identified (act 252), and the file information is generated for that file (act 254). Optionally, the computing device may then store the generated file information and wait for additional file information to be generated (act 256), and then return to act 250 to generate more file information. The optional waiting period allows file information for multiple files to be forwarded to the identified database server(s) as a set rather than one-by-one. After the waiting period is over, or if the optional waiting is not performed, one or more database servers to receive the generated file information are identified (act 258). Which one or more database servers are to receive the file information can vary, as discussed in more detail below. The generated file information(s) is then transmitted to the identified database servers (act 260). It should also be noted that, based on different implementations as discussed below, the database server(s) to which the file information is to be transferred may not be readily identifiable (e.g., the computing device may not be aware of them yet).

Figure 4:
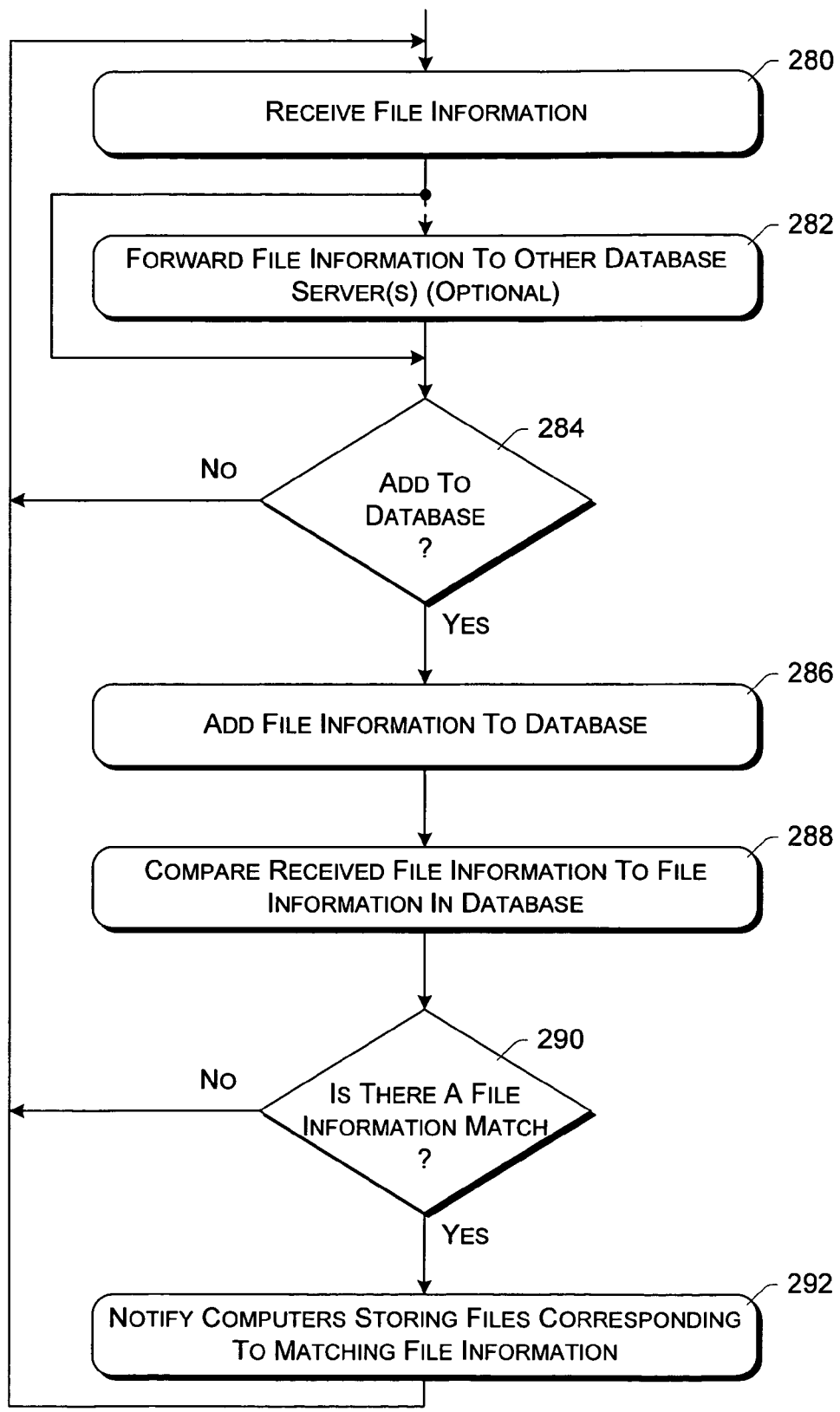
FIG. 4 is a flowchart illustrating an exemplary process followed by a database server in accordance with certain embodiments of the invention.

FIG. 4 is a flowchart illustrating an exemplary process followed by a database server in accordance with certain embodiments of the invention. The process of FIG. 4 is carried out by a computing device 200 of FIG. 2, or alternatively a dedicated server (e.g., a device 200 without file information generation module 220) and may be implemented in software.

Initially, file information is received (act 280). The manner in which the file information for various files is received (e.g., individually or in sets), as well as which computers the file information is received from, can vary and is discussed in more detail below. The received file information is optionally forwarded to one or more other database servers (act 282). Whether the file information is forwarded to another database server(s), as well as to what server(s) the file information is forwarded, varies by implementation as discussed in more detail below. Regardless of whether the file information is forwarded to other database servers, a check is made as to whether the file information should be added to the database of the database server that received the file information (act 284). Whether the file information should be added to the database is based on certain criteria that vary by implementation, as discussed in more detail below. In some implementations, there is no checking in act 284 and all received file information is added to the database. If the received file information is not to be added to the database, then the process returns to act 280 where additional file information is eventually received.

However, if the file information is to be added to the database, then the received file information is added to the database maintained by the database server (act 286), and is compared to other file information in the database (act 288). The database server also checks whether the newly received file information matches (is the same as) any of the file information already in the database (act 290). If the received file information does match file information(s) in the database, then the computers storing the files corresponding to the matching file information are notified of the match (act 292) so that they can take appropriate action. The process then returns to act 280 where additional file information is eventually received.

Additionally, in some situations copies of files may be replicated and stored in multiple locations (e.g., different computers) in the network for fault tolerance purposes. For example, in a serverless distributed file system, where the user has no guarantee that his or her file will be stored on a particular computer, the file may be replicated and stored on multiple computers so that the user can still access his or her file even if one or more of the computers is unavailable. When such replicated files exist in the network, care should be taken to ensure that they are not identified as duplicate copies and combined into a single file, and thus subvert the fault tolerance created by the replicated copies.

In one embodiment, the management of replicated file copies is handled by computing devices acting as directory servers (e.g., in distributed file system 150 of FIG. 1). In this embodiment, the directory servers are responsible for both replicating files as well as identifying duplicate files, and thus know whether a particular file is a replica they created of another file. In one implementation, the duplicate identification is performed at a higher level than the replicated storage (e.g., duplicate identification is performed prior to replicating a file), thereby avoiding identification of a replicated file as a potentially duplicate file.

In certain embodiments discussed herein, various decisions are made by the computers based on a number of computers that exist in the network. Computers can determine an approximate number of computers that are coupled together in the network in a variety of conventional manners (note, however, that in some situations it is difficult to obtain an exact number of computers that are coupled together in a network if the number of computers is very high, because computers can be continually joining and leaving the network). In one implementation, each time a computer logs into (or is otherwise coupled to) a network its presence is advertised to the network and propagated by the computers throughout the network. Additionally, each time a computer logs off (or is otherwise de-coupled is from) a network, its retirement is advertised to the network and propagated by the computers throughout the network. Additional monitoring computers may also be established to monitor computers coupled to the network and detect (e.g., due to inactivity) their retirement from the network. Alternatively, any of a variety of other conventional processes may be used for identifying the topology and/or number of computers in the network.

Various different implementations for forwarding the file information to a database server(s), as well as communication among multiple database servers, exist. These various implementations will now be discussed. It should be noted that, in the discussions herein, reference is made to client computers and database server computers. These references are for the purposes of communicating and managing file information as described herein. In the distributed serverless environment, computers can be both client computers as well as database server computers.

Centralized Database Implementation

In the centralized database implementation, the client computers in the network are categorized into one or more groups, and each group includes one or more database servers. For each group, each client computer in that group forwards the file information it generates to one or more of the database servers in that group. Each database server can then identify potentially identical files based on the file information it receives from client computers in that group. Additionally, the servers may optionally forward the file information they receive to other servers in other groups, thereby allowing potentially identical files located on client computers that have been categorized into different groups to be identified.

Figure 5:
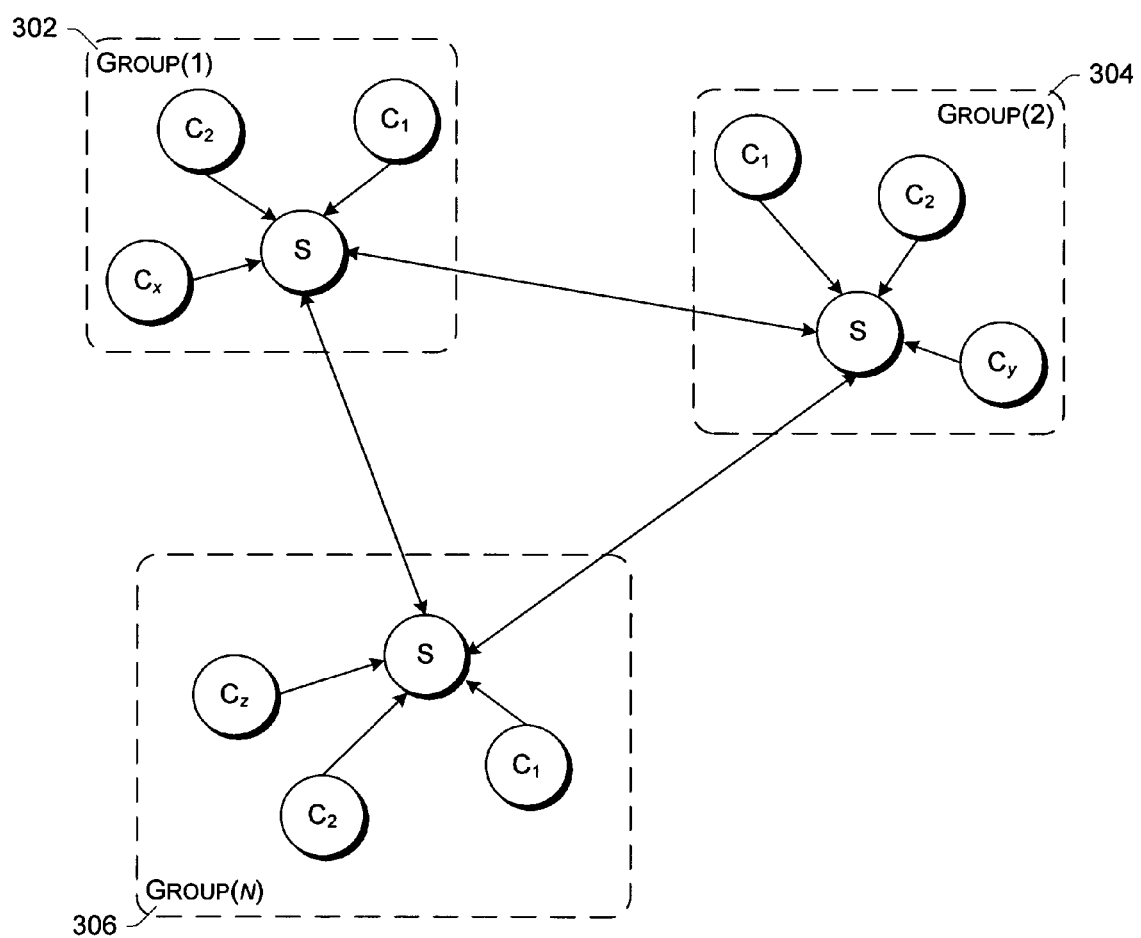
FIG. 5 illustrates an exemplary centralized database implementation in accordance with certain embodiments of the invention.

FIG. 5 illustrates an exemplary centralized database implementation in accordance with certain embodiments of the invention. In the illustrated example, a network 300 of multiple client computers (C) are categorized into multiple (n) groups 302, 304, and 306. Each group may include the same number of client computers (C), or alternatively different numbers. Furthermore, each client computer (C) belongs to one group, and may optionally belong to multiple groups (resulting in the client computer forwarding its file information to database servers for multiple groups).

Each group 302, 304, and 306 also includes one or more database servers (S). Although only one database server is illustrated in each group of FIG. 5, multiple database servers may be included in any one or more of the groups 302, 304, and 306. Each group 302, 304, and 306 may include the same number of database servers, or alternatively varying numbers of database servers. The database servers in the groups 302, 304, and 306 communicate with each other, with each database server transferring the file information it receives to the database servers of the other groups. This communication among the database servers allows the file information to be shared, so that potentially identical files stored on client computers (C) in different groups can be identified.

The manner in which client computers are categorized or separated into groups can vary. In one embodiment, the categorization is based on the naming convention used in naming the client computers and servers in network 300. The naming convention used in network 300 establishes multiple namespace roots which are assigned to selected client computers or servers in network 300, and then multiple lower-level names that are "under" the corresponding namespace root computers. One or more of these namespace root client computers or servers, as well as all of the lower-level names under those roots, belong to the same group.

Alternatively, client computers can be categorized into different groups in different manners, such as randomly, by client computer type, based on the date and/or time that they were coupled to network 300, based on geographic location, based on network connection type, and so forth.

Each client computer (C) knows the server (S) to which it is to transfer the file information it generates. In one embodiment, each client computer (C) transfers the file information it generates to the system at its namespace root, which is a database server (S). Alternatively, each client computer (C) may be programmed in another manner with an indication of the server (S) to which it is to transfer the file information it generates. The client computer (C) may receive a communication from a namespace server (S) identifying where the client computer should transfer its file information, or alternatively the client computer (C) may locate the database server (S) itself. For example, the group with the namespace root corresponding to a client computer (C) may keep information (e.g., addresses) identifying the database servers (S) for the group the computer (C) is in. The namespace root computer may identify all of these database servers (S) to the requesting client computer (C), or alternatively may assign the client computer (C) to communicate with a particular one of the database servers (S). Additionally, a client computer (C) may communicate with one or more other client computers (C) to identify the root (or other) computer that it needs to access to determine the database server (S) to which it is to transfer the file information it generates.

When multiple database servers (S) exist within a group, responsibility for managing the database can be shared by the servers in any of a variety of manners. For example, particular servers may be assigned to receive file information from client computers (C) in particular address ranges, or file information for files in particular size ranges or creation date ranges, and so forth. This allows load and storage requirements to be partitioned among multiple database servers.

Additionally, multiple database servers may be employed for fault tolerance. In this situation, multiple servers are assigned to the same file information range so that if one or more of the servers fails (or is otherwise inaccessible) another is still available to do the processing. When employing multiple database servers for fault tolerance, care should be taken so that all of the servers handling a particular file information range are coordinated so as to generate only a single message to the client machines informing them about the detection of a potentially duplicate file. Alternatively, clients may only send file information to a single server assigned to a file information range and then rely on the servers to notify each other of new file information that any one of them has received. If a client cannot reach one server then it tries another assigned to the range.

Figure 6:
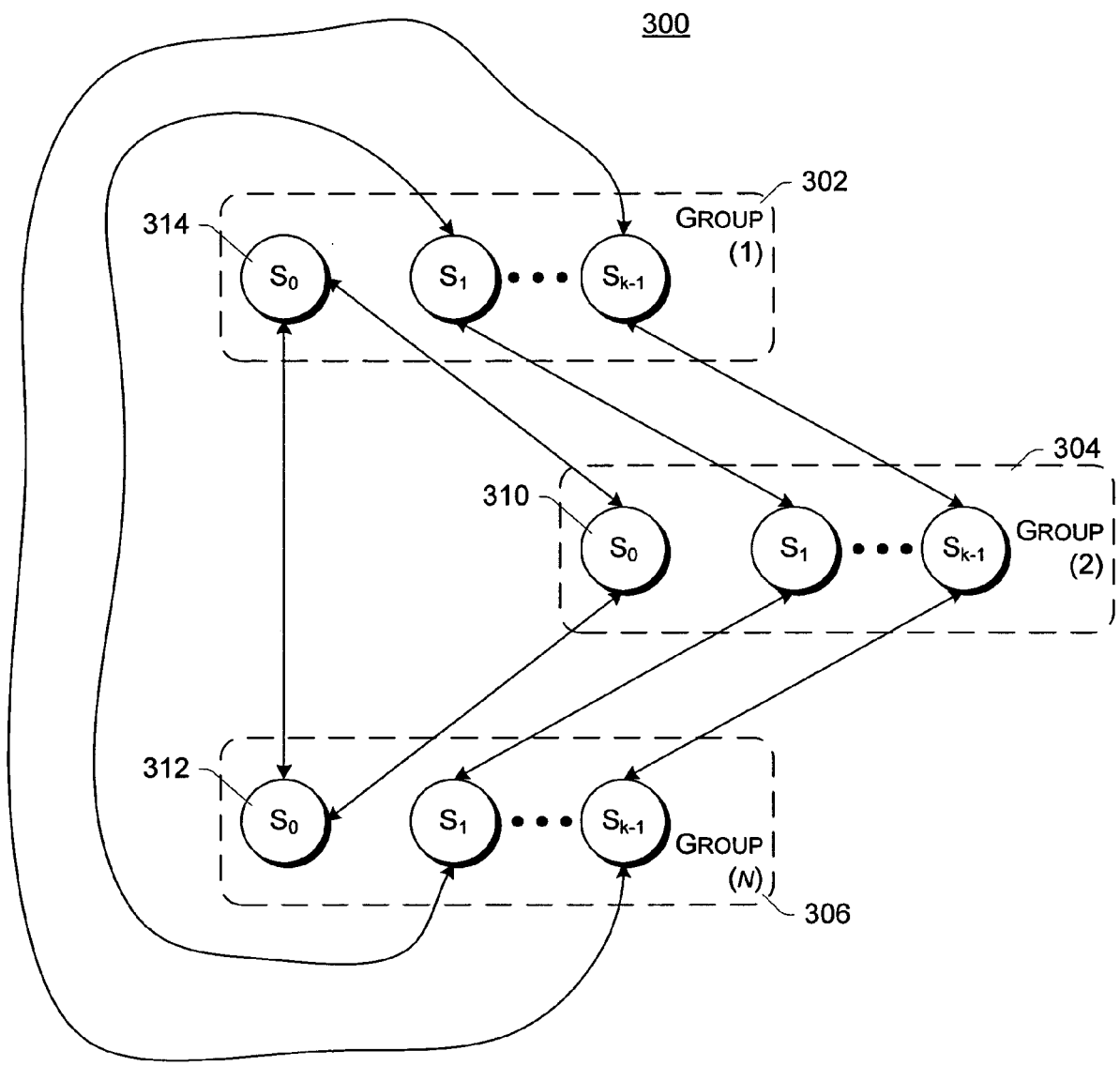
FIG. 6 illustrates an exemplary network environment in which responsibility for managing the file information database is shared among multiple database servers in each group.

FIG. 6 illustrates an exemplary network environment 300 in which responsibility for managing the file information database is shared among multiple database servers in each group. Although one or more client computers (C) exist in each group 302, 304, and 306, for ease of explanation and to avoid cluttering the drawings the client computers (C) have not been shown. Rather, only the database servers (S) are illustrated in the groups 302, 304, and 306.

In the illustrated example of FIG. 6, each group 302, 304, and 306 includes the same number (k) of database servers (S). Alternatively, each group need not include the same number of database servers (S). For example, a set of rules or an algorithm could be defined that tells each database server (S) in a group which one or more database servers (S) in the other groups to communicate with (e.g., group 302 might have twice as many database servers (S) as group 304, with the file information space being divided up so that the piece that a database server (S) in group 304 handles is equivalent to two pieces handled by two different database servers (S) in group 302). By way of another example, if communication between database servers (S) in different groups is not needed, then each group need not include the same number of database servers (S). For purposes of discussion, however, it is assumed that each group 302, 304, and 306 includes the same number of database servers.

The file information generated by a client computer (C) is used to determine which database server (S) to transmit the file information to. After generating the file information, the client computer (C) calculates the following value:

$$v = \text{info} \bmod k$$

where info is the generated file information and k is the number of database servers (S) in the group. The resultant value v is a value ranging from zero to (k−1). Each of the k database servers is associated with one of the values in the range from zero to (k−1), and the client computer (C) forwards the file information to the database server associated with the resultant value v.

Each of the database servers (S) also communicates with the corresponding database servers (S) in the other groups. By identifying the database server (S) that is to handle particular file information based on the file information itself, the number of database servers (S) in the other groups that need to be communicated with in order to identify potential duplicate files across different groups is reduced (basically, each server need only communicate with one other server in each other group). So, for example, if a client computer (C) in group 304 generates file information that results in a value v of zero, the client computer communicates the file information to server 310. Server 310 is then able to compare the received file information to other file information it stores and identify any potential duplicate files within group 304. Additionally, database server 310 communicates the generated file information to servers 312 and 314 to identify any potential duplicate files in groups 306 and 302, respectively.

When database servers (S) communicate with database servers (S) in other groups, the file information sent between groups is not stored by the servers in the other groups (because it does not represent information about files in their groups). Rather, the file information is used to identify any matches with file information stored by the receiving database server, and then dropped after the match checking is completed. Alternatively, the file information could be stored by the servers in other groups (optionally with an indication of from which other group the file information was received).

In the centralized database implementation, two special situations arise. One situation is when the number of client computers in each group is equal to one, and the other is when the number of client computers in a group is equal to all of the computers in the network. These special situations will now be discussed.

If the number of computers in each group is equal to one, then the centralized database implementation becomes a "localized pair-wise checking" implementation in which each of the client computers is its own group and each client computer maintains its own file information mappings. Thus, each client computer also acts as a database server. Whenever one client computer becomes aware of another client computer in the network, the client computer communicates all of the file information it has generated for its files to the other client computer, allowing the other client computer to check for potentially duplicate files. The communication may occur immediately after the client computer becomes aware of the other client computer, or alternatively after a period of time (e.g., a delay may be incurred while the computer is performing other functions, while the computer waits for a period of low use on the network, and so forth). The client also subsequently sends incremental file information updates to the other client computer as new file information is generated.

Figure 7:
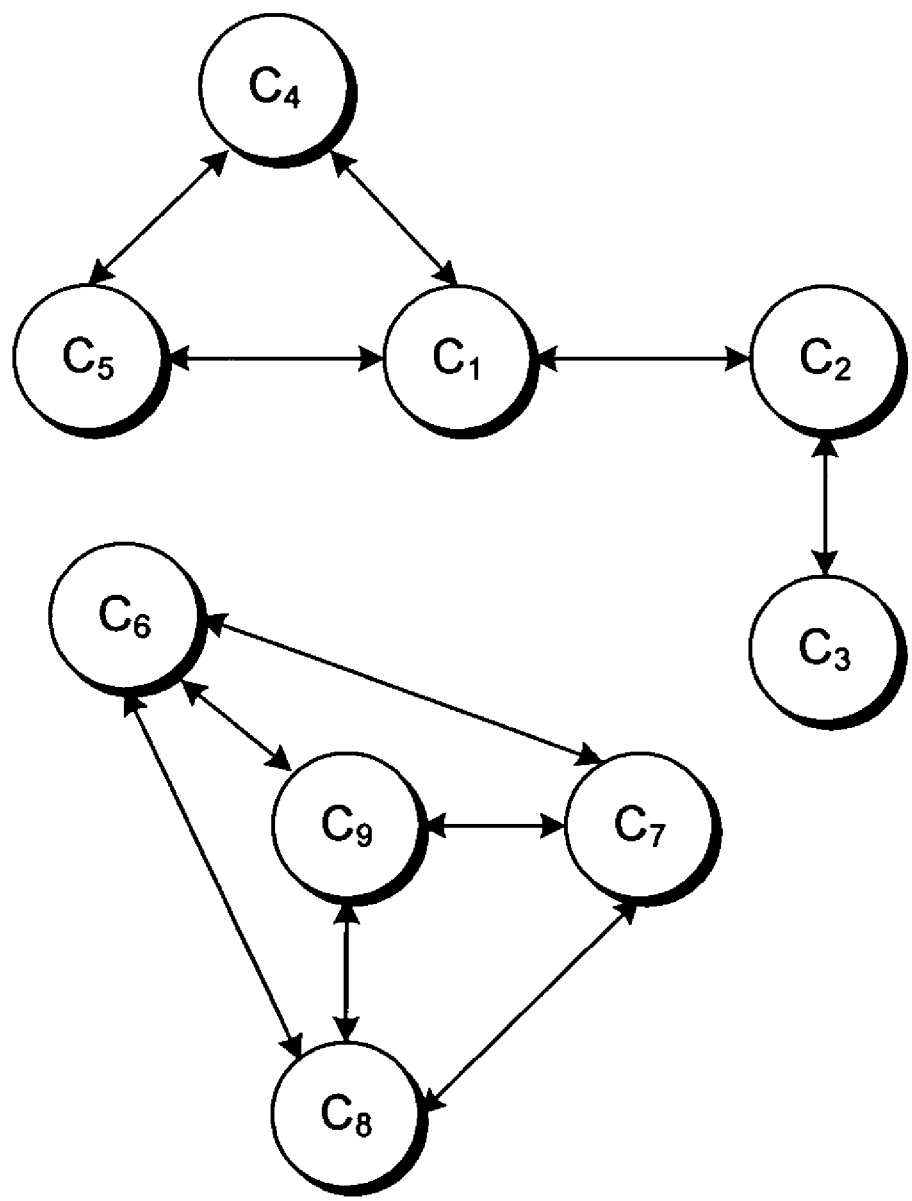
FIG. 7 illustrates a localized pair-wise checking implementation in additional detail.

FIG. 7 illustrates the localized pair-wise checking implementation in additional detail. For ease of explanation, network 350 is illustrated including only nine computers (C). In network 350, computers $C_1$ and $C_2$ are aware of each other and have communicated their file information between them. Similarly, computers $C_2$ and $C_3$ are aware of each other and have communicated their file information between them. Note, however, that the computers $C_1$ and $C_3$ are not aware of each other and thus have not communicated their file information between them. Additionally, computers $C_1$ and $C_4$ are aware of each other, as are computers $C_1$ and $C_5$, and computers $C_4$ and $C_5$. Thus, for computers $C_1$ through $C_5$, each of the computers is aware of some of the other computers $C_1$ through $C_5$, but not all.

For computers $C_6$, $C_7$, $C_8$, and $C_9$, each of these four computers is aware of each of the others, and thus each has communicated its file information to the others. Note, however, that none of the computers $C_1$ through $C_5$ is aware of any of the computers $C_6$ through $C_9$, nor are any of the computers $C_6$ through $C_9$ aware of any of the computers $C_1$ through $C_5$.

A client computer can become aware of another client computer in any of a wide variety of conventional manners. In one implementation, any of a variety of well-known network mapping processes can be used by a client computer to identify other client computers on the network it is coupled to. Alternatively, a computer may broadcast its presence when added to a network.

Alternatively, rather than forwarding its file information to any other client computer that a client computer becomes aware of, additional restrictions on what client computers the file information will be forwarded to may be imposed. For example, a client computer may forward its file information only to client computers that are within a particular range (e.g., geographically close, within a particular number of links or routers on the network, and so on).

In addition to transmitting its own file information to other client computers of which a particular client computer is aware, the client computer may also forward file information that it has received from other computers as well. For example, in network 350, client computer $C_2$ may initially become aware of client computer $C_3$, and receive all of the file information of client computer $C_3$. When client computer $C_2$ subsequently becomes aware of client computer $C_1$, client computer $C_2$ communicates all of its file information, as well as all of the file information received from client computer $C_3$, to client computer $C_1$.

In one implementation, file information for each file is also associated with a "time to live" component that identifies how many client computers the file information can be communicated to. Each time the file information is communicated to another client computer, the time to live component is decremented by one. Once the time to live component reaches zero, the file information is not communicated to any more client computers. Various alternatives may be implemented for the time to live component, such as different threshold values could be used for different computers or different files (e.g., a file with an indicated or perceived greater importance could be assigned a larger value for its time to live component), the count could be decremented by more or less than one, the count could be incremented and compared to an upper bound rather than decremented and compared to zero, and so forth. For example, following the previous example, assume that the file information for each file from client computer $C_3$ has a time to live component with a value of two. When the file information is communicated to client computer $C_2$ the associated time to live component(s) for the file information of client computer $C_3$ on client computer $C_2$ are decremented to the value of one. Then, when the file information of client computer $C_3$ are communicated to client computer $C_1$ the associated time to live component(s) for the file information of client computer $C_3$ on client computer $C_1$ are decremented to the value of zero. Thus, even though client computer $C_1$ may be aware of, or may subsequently become aware of, client computers $C_4$ and $C_5$, client computer $C_1$ does not communicate the file information of client computer $C_3$ to either of computers $C_4$ or $C_5$. However, if client computer $C_3$ were to subsequently become aware of either client computer $C_4$ or $C_5$, then client computer $C_3$ would communicate its file information to the appropriate one of client computer $C_4$ and $C_5$ and the associated time to live component(s) for the file information of client computer $C_3$ on client computer $C_4$ or $C_5$ would be decremented to the value of one.

File information for each file may be associated with its own "personal" time to live component, or alternatively file information for multiple files from the same client computer may be grouped together (e.g., into a single set for the client computer) and have an associated time to live component. File information for different files and/or different computers can optionally have different time to live components. For example, file information for larger files may have longer time to live components than shorter files (e.g., assuming that the potential space savings of finding a duplicate of the larger file is worth the extra burden of communicating the file information to additional client computers).

Additionally, in the localized pair-wise checking implementation, file information can optionally be communicated among the computers in a compressed form. Any of a variety of conventional techniques can be used to communicate the information in a compressed form, such as the use of well-known Bloom filters. For additional information on Bloom filters, the reader is directed to L. Fan, P. Cao, J. Almeida, and A. Broder, "Summary Cache: A Scalable Wide-Area Web Cache Sharing Protocol", ACM SIGCOMM, 1998.

The other special situation that can arise in the centralized database implementation is when the number of client computers in a group is equal to all of the computers in the network. In this situation, the centralized database implementation reduces to a single group and the one or more database servers in the network receive the file information from all the client computers. Each database server may receive file information from all of the computers, or alternatively only for select client computers (e.g., based on the file signature itself analogous to the discussion above regarding FIG. 6).

Figure 8:
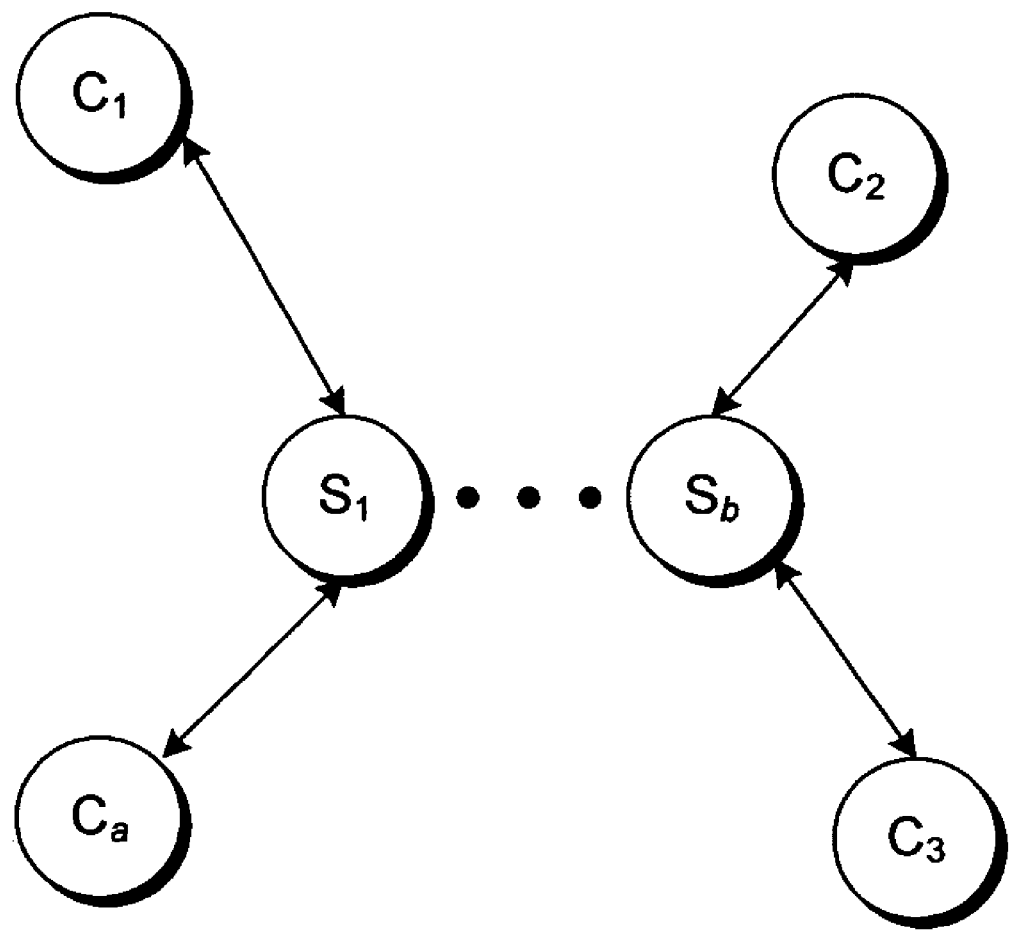
FIG. 8 illustrates the special situation when the number of client computers in a group is equal to all of the computers in the network in additional detail.

FIG. 8 illustrates the special situation when the number of client computers in a group is equal to all of the computers in the network in additional detail. In network 360, multiple (a) client computers (C) are illustrated along with multiple (b) servers (S). All of the client computers (C) are part of the same group, communicating their file information to one or more of the servers (S).

Fully Distributed Stochastically Partitioned Database Implementation

In the fully distributed stochastically partitioned database implementation, each computer in the network operates as both a client computer and a database server. Alternatively, some machines might function only as clients and not as database servers, while other might function only as database servers and not as clients. Each computer generates file information for files stored at its computer, and forwards that generated file information to one or more other computers. To which computers particular file information is forwarded is based on both the generated file information as well as identifiers (ID's) for each computer in the network, as discussed in more detail below. Each computer, then, is responsible for comparing the file information it receives from computers in the network and determining whether any of the received file information matches each other.

In the fully distributed stochastically partitioned database implementation, each computer in the network is assigned a computer ID. The computer ID's can be assigned in any of a variety of manners. However, in order to spread out the file information processing relatively evenly among all of the computers, the computer ID's should be assigned such that the computer ID's are fairly evenly distributed throughout the Hamming space of possible computer ID's. More specifically, this even distribution is important for a particular subset of W bits of the computer ID, as described below.

In one embodiment, each computer in the network includes a public/private key pair used in public key cryptography. The computer ID for a particular computer is generated based on the public key of this key pair, such as by applying a one-way hashing function (e.g., SHA, MD5, etc.) to the public key and using the resultant hash value as the computer ID. Alternatively, different processes can be used to create the computer ID for a computer, such as use of a conventional random number generator (or pseudo-random number generator) by a central authority that assigns computer ID's, use of an identification number assigned to the CPU in the computer, and so forth.

Figure 9:
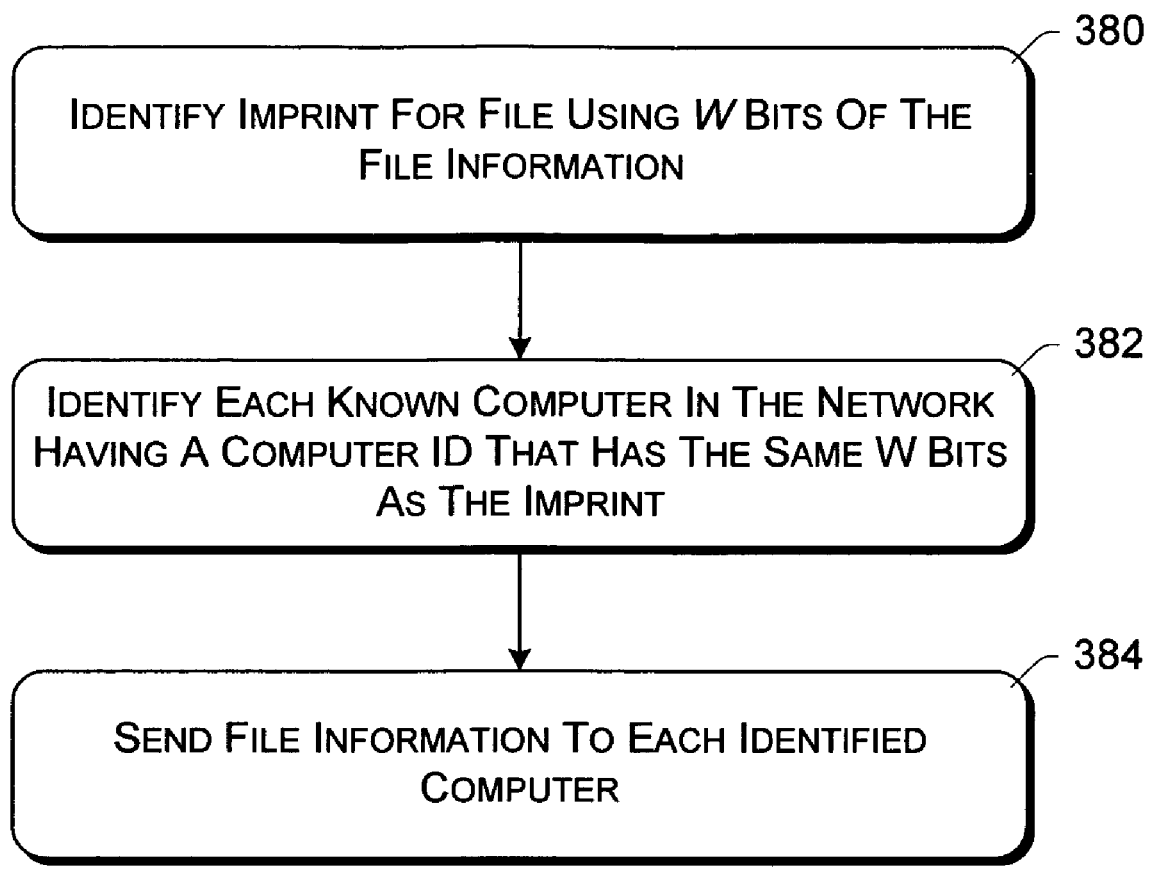
FIG. 9 is a flowchart illustrating an exemplary process followed by each computer for the fully distributed stochastically partitioned database implementation in accordance with certain embodiments of the invention.

FIG. 9 is a flowchart illustrating an exemplary process followed by each computer for the fully distributed stochastically partitioned database implementation in accordance with certain embodiments of the invention. The process of FIG. 9 is carried out by a computing device 200 of FIG. 2, and may be implemented in software.

For each file stored at the computer for which file information is generated, an imprint for the file is identified using W bits of the file information (act 380). Which W bits of the file information to use can vary, but should be consistent across all the files in the system. In one implementation, the W least significant bits of the file information are used as the imprint. The choice of which W bits to use should try to result in a fairly uniform mapping of imprint to file information so that unwanted clustering effects do not arise.

The computer also identifies each known computer in the network that has a computer ID that has the same W bits as the imprint (act 382). Which W bits of the computer ID to use can vary, but should be consistent across all the computers in the network. In one implementation, the W least significant bits of the computer ID are used. The choice of which W bits to use should try to result in a fairly uniform mapping of W bits to computer ID so that unwanted clustering effects do not arise. Alternatively other bits may be used (the selected bits of the file information used may be the same as the bits used for the imprint of the file information, or alternatively different bits may be selected). Once these computers are identified, the computer that generated the file information sends the file information to each of the computers identified in act 382 (act 384).

Each computer calculates its own value of W as follows:

$$W = \left\lfloor \lg \frac{M}{R} \right\rfloor$$

where the value M is the total number of computers in the network that the computer knows about (possibly including itself), R is a system configuration parameter, lg indicates a binary (base 2) logarithm, and the floor brackets indicate the largest integer that is no greater than the enclosed value. The value M represents the number of computers that function as database servers; if some machines act solely as clients and not as database servers, then they will not be included in this number. The value M can vary by computer, which means that the value W can vary by computer. However, despite these variations, potentially identical files can still be identified. Each computer can identify the value M in any of a wide variety of conventional manners, such as using any of a variety of conventional network topology identification processes to determine the location and number of computers in the network.

The value R is a system configuration parameter that imposes a bound on the average number of computers to which particular file information is communicated. The bound imposed by R is as follows:

$$R \leq \lambda < 2R$$

where $\lambda$ is the average number of computers to which particular file information is communicated. The value of R can vary by implementation. In one implementation, typical values for R range from 3 to 6.

Figure 10:
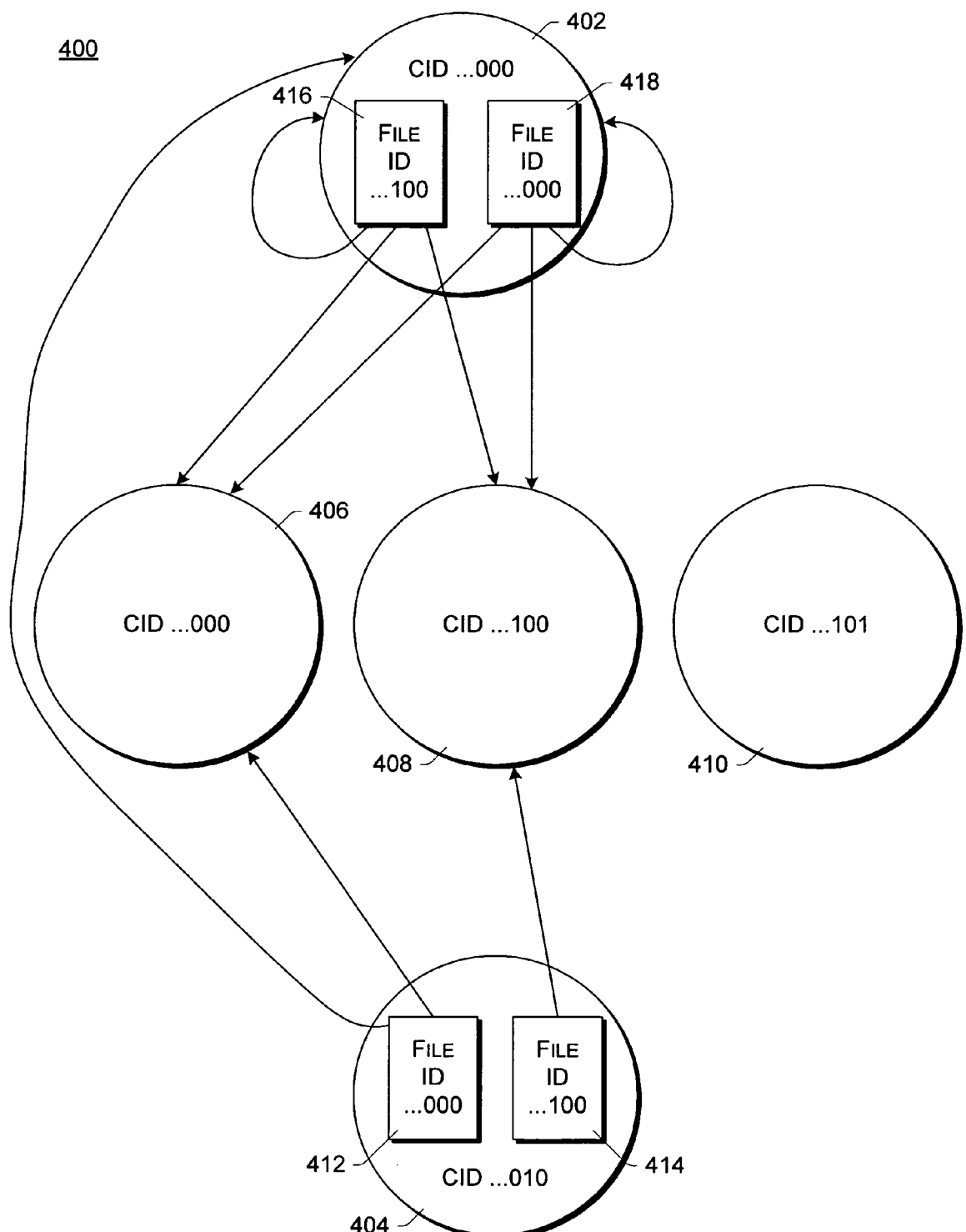
FIG. 10 illustrates an exemplary network in which a fully distributed stochastically partitioned database implementation is employed.

FIG. 10 illustrates an exemplary network 400 in which the fully distributed stochastically partitioned database implementation is employed. Although network 400 includes many computers, only five computers are illustrated in FIG. 10 for ease of explanation and to avoid cluttering the drawings. Network 400 includes computers 402, 404, 406, 408, and 410. The communication of file information for two files from each of computers 402 and 404 is illustrated in FIG. 10.

In the example of FIG. 10, assume that computers 402 and 404 each believe a different number of computers exist in network 400, and that computer 402 has calculated a value of W=2, while computer 404 has calculated a value of W=3. Further assume that the location of the W bits being used for both the file information and the computer ID's are the W least significant bits. Each of the computers 402-410 is assigned a computer ID. Only the three least significant bits of the computer ID is shown for each computer 402-410; the more significant bits of the computer ID are not shown. As illustrated, the least significant bits of the computer ID for computers 402 and 406 are "000", while the least significant bits of the computer ID for computer 404 are "010", the least significant bits of the computer ID for computer 408 are "100", and the least significant bits of the computer ID for computer 410 are "101".

Two files 412 and 414 are illustrated as stored at computer 404, having file information with least significant bits of "000" and "100", respectively. Computer 404 has calculated a value of W=3, so computer 404 generates an imprint for file 412 that is the three least significant bits of the file information for file 412. The imprint of file 412 is thus "000". Computer 404 then transfers the file information for file 412 to all other computers in network 400 that have a computer ID with the three least significant bits equal to "000". Thus, computer 404 transfers the file information for file 412 to computer 402 and computer 406. Similarly, the imprint of file 414 is "100", so computer 404 transfers the file information for file 414 to computer 408.

Two additional files 416 and 418 are illustrated as stored at computer 402, having file information with least significant bits of "100" and "000", respectively. Computer 402 has calculated a value of W=2, so computer 402 generates an imprint for file 416 that is the two least significant bits of the file information for file 416. The imprint of file 416 is thus "00". Computer 402 then transfers the file information for file 416 to all other computers in network 400 that have a computer ID with the two least significant bits equal to "00". Thus, computer 402 transfers the file information for file 416 to computer 406, computer 408, and computer 402 (back to itself). Similarly, the imprint of file 418 is also "00", so computer 402 also transfers the file information for file 418 to computers 406, 408, and 402.

It should be noted that in the example of FIG. 10, computers 402 and 404 have calculated different values of W. This results in computers 402 and 404 identifying different imprints for their file information and sending them to different sets of computers (e.g., even though the least significant bits of both files 412 and 418 are "000", the file information for file 412 (having an imprint of "000") is not sent to computer 408, while the file information for file 418 (having an imprint of "00") is sent to computer 408). Essentially, computer 402 ends up typically sending its file information to more computers than computer 404. However, potentially identical files on computers 404 and 402 can still be identified because the set of computers derived from a smaller value of W is a superset of those derived from a larger value of W (so the file information from both computers is sent to some of the same computers (e.g., computers 402 and 406)).

It should also be noted that situations can arise where there is no computer with a computer ID that has the W bits matching the imprint of the file information. For example, if W=3, and the imprint is "001", situations can arise where there are no computers having a computer ID with the corresponding bit values of "001". In one implementation, this situation is resolved by simply not forwarding the file information to any computer. However, note that in the example of FIG. 10, computer 402 has calculated a value of W=2, so it would send any file information that ends with "001" to computer 410, since the two least significant bits match. Thus, although calculating a lower value of W increases the work that a computer does (as described above), it also increases the probability that duplicate files will be found. Alternatively, other solutions may be used when there is no identified computer for some values of file information, such as assigning a particular computer to be the recipient of any such file information, or changing one or more bits of the imprint (so long as all the computers agree to use the same algorithm for changing the bits of the imprint).

Group-Based System Using Directory Services Implementation

The group-based system using directory services implementation is similar to the fully distributed stochastically partitioned database implementation. Imprints are generated based on file information as discussed above, however, a database of imprint to computer ID mappings is accessed to determine which computers the file information is to be communicated to, thereby requiring the file information to potentially be sent to fewer computers than in the fully distributed stochastically partitioned database implementation.

Figure 11:
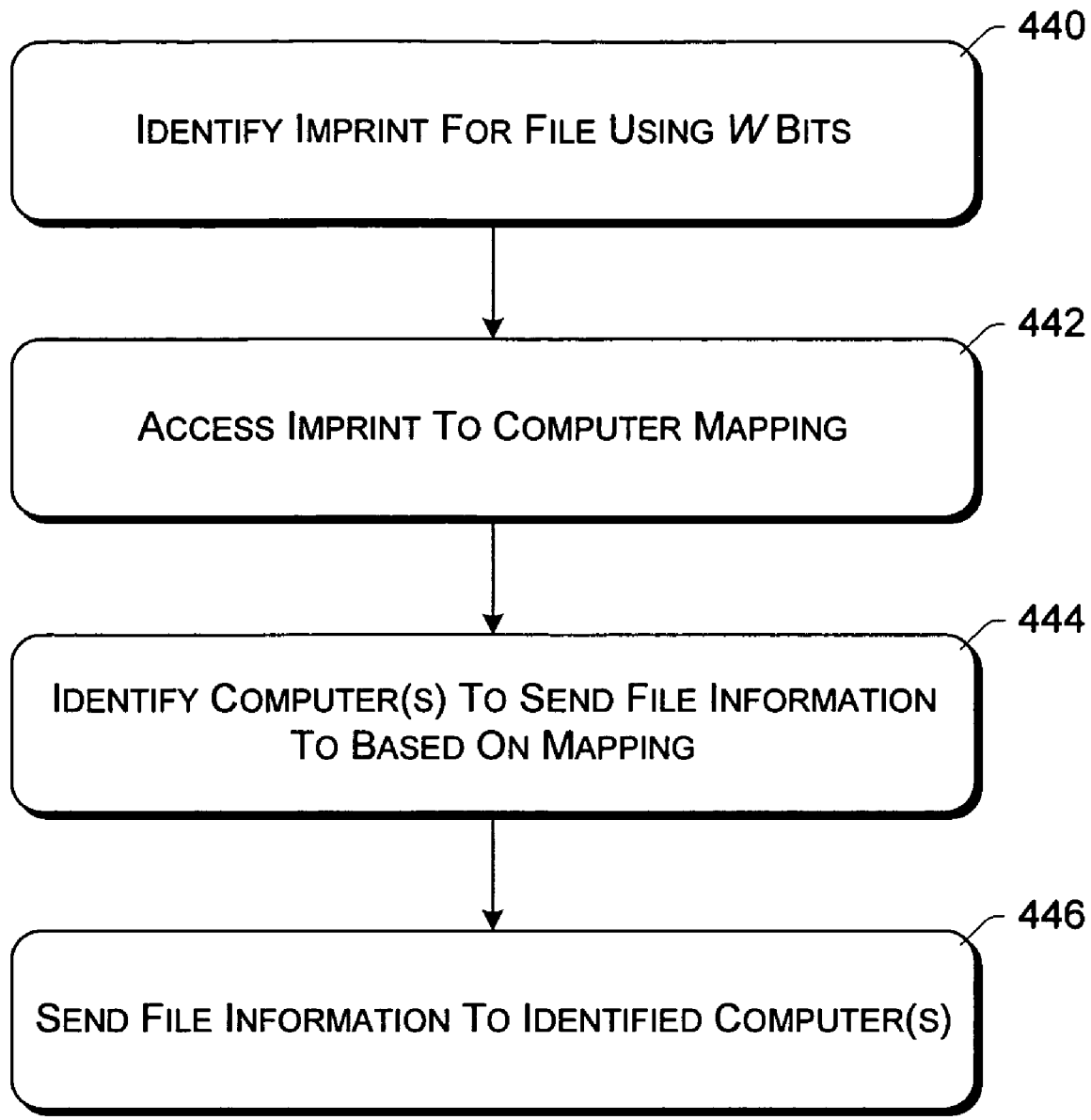
FIG. 11 is a flowchart illustrating an exemplary process followed by each computer for the group-based system using directory services implementation in accordance with certain embodiments of the invention.

FIG. 11 is a flowchart illustrating an exemplary process followed by each computer for the group-based system using directory services implementation in accordance with certain embodiments of the invention. The process of FIG. 11 is carried out by a computing device 200 of FIG. 2, and may be implemented in software.

For each file stored at the computer for which file information is generated, an imprint for the file is identified using W bits of the file information (act 440), analogous to act 380 of FIG. 9 above. An imprint to computer mapping is then accessed (act 442). The imprint to computer mapping is initially retrieved from one or more computers in the network that are designated mapping servers. The mapping may optionally be subsequently cached at the computer so that subsequent requests can be handled by the computer locally rather than requiring a network access. Based on this mapping, one or more computers in the network to which the file information is to be transferred are identified (act 444), and the computer sends the file information to those other computers (act 446). The imprint to computer mapping may map the imprint to a computer ID, or alternatively some other name or identification of the computer.

The imprint to computer ID mappings are stored on the designated mapping servers and are accessible to other computers in the network. The designated mapping servers may be dedicated mapping servers, or alternatively may be computing devices such as device 200 of FIG. 2 that include both server and client functionality. Analogous to the database servers discussed above, multiple computers may be designated mapping servers, and each computer knows one or more mapping servers (or can ascertain the identity of one or more mapping servers) from which it can retrieve mappings. Also analogous to the database servers discussed above, if multiple designated mapping servers are employed, they may share mapping information (for fault tolerance purposes, such as one being a backup for another), or alternatively different servers may be designated to handle requests for different imprints (for load sharing purposes).

The imprint to computer mapping maps the imprint to one or more computers in the network. The imprint to computer mapping may map the imprint to a computer(s) having a computer ID that has the same W bits as the imprint, or alternatively a computer having a computer ID with W bits that are not the same as the imprint. In other words, there may be, but need not be, any correlation between the imprint and the W bits of the computer ID's in the mapping. By not tying the mapping to the W bits of the computer ID, the mapping server(s) need not store information about the W bits of all computer ID's in the network. Rather, the mapping server(s) can store only the computer ID's of the set of computers that they have designated to be file information processing servers.

In one implementation, the computer sends the file information to each other computer identified in the imprint to computer mappings (act 446 of FIG. 11). Alternatively, the computer may send the file information to only one of the computers identified in the imprint to computer mappings. According to this alternative, computers that receive the file information know which other computers are responsible for checking for file information matches for particular imprints (e.g., by accessing a designated mapping server and obtaining the imprint to computer mappings for that mapping). Any file information received by one of the computers is then forwarded to the other computer(s) responsible for checking for file information matches for that particular imprint.

Figure 12:
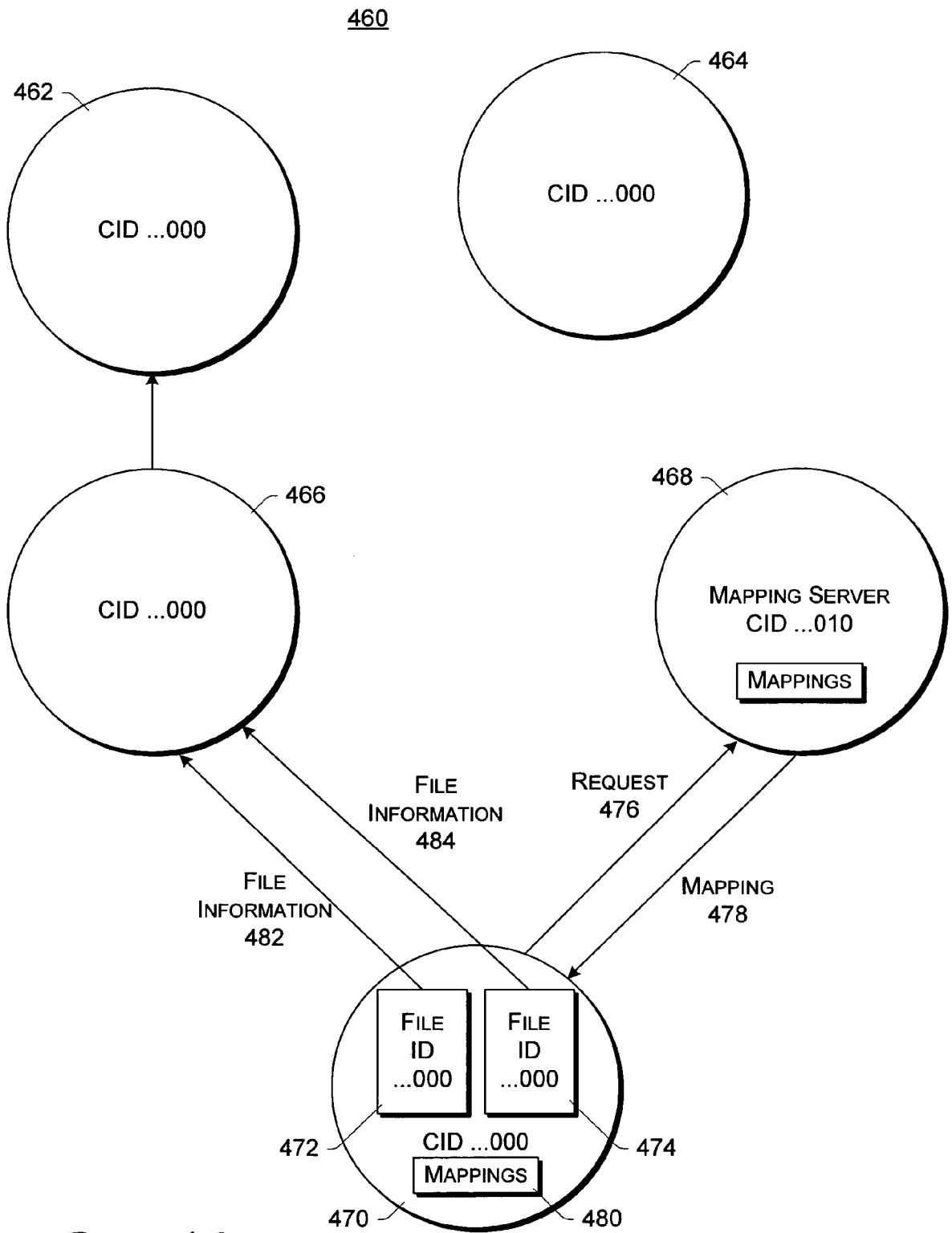
FIG. 12 illustrates an exemplary network in which the group-based system using directory services implementation is employed.

FIG. 12 illustrates an exemplary network 460 in which the group-based system using directory services implementation is employed. Although network 460 includes many computers, only five computers are illustrated in FIG. 12 for ease of explanation and to avoid cluttering the drawings. Network 460 includes computers 462, 464, 466, 468, and 470. The communication of file information for two files 472 and 474 from computer 470 is illustrated in FIG. 12.

In the example of FIG. 12, assume that computer 470 has calculated a value of W=3, and that the location of the W bits being used for both the file information and the computer ID's are the W least significant bits. Each of the computers 462-470 is assigned a computer ID. Only the three least significant bits of the computer ID is shown for each computer 462-470; the more significant bits of the computer ID are not shown. As illustrated, the least significant bits of the computer ID for computers 462, 464, 466, and 470 are "000", while the least significant bits of the computer ID for computer 468 is "010". Computer 468 is designated as the mapping server.

When computer 470 generates the file information for file 472, it uses the W least significant bits of the file information as the imprint, which is "000". Assuming computer 470 does not have a locally stored computer mapping for imprint "000", computer 470 sends a request 476 to mapping server 468 for the imprint to computer mapping for imprint "000". The mapping 478 is returned by mapping server 468, and stored in mappings 480 of computer 470. All computers identified by mapping 478 may be stored in mappings 480, or alternatively only a subset of the computers (e.g., one or two computers). For purposes of discussion, assume that mapping 478 indicates that computers 466 and 462 are to receive file information with imprints of "000". Computer 470 then forwards the file information 482 for the file 472 to computer 466, which in turn receives the file information 482 and communicates it to computer 462. Alternatively, computer 470 may forward the file information 482 to both computer 462 and 466.

Subsequently, computer 470 generates the file information for file 474 and identifies the imprint of the file information as "000". Rather than accessing mapping server 468, local mapping 480 is accessed to identify that the file information is to be communicated to computer 466 (and/or computer 462). computer 470 then forwards the file information 484 to computer 466 (and/or computer 462). If the computer identified in mapping 480 is not available (e.g., computer 462 is identified in mapping 480 but it has failed or is otherwise inaccessible), computer 470 sends another request to mapping server 468 requesting identification of another computer(s) that is mapped to the imprint "000".

It should be noted that, by having more than one computer in the mapping for a given W, improved fault tolerance is achieved because there are multiple computers that can process the file information. However, if fault tolerance is less of a concern, then fewer (including only one) computers may be included in the mapping for a given W.

Multi-Level Stochastically Partitioned Database Implementation

The multi-level stochastically partitioned database implementation is similar to the fully distributed stochastically partitioned database implementation. Imprints are generated based on file information as discussed above, however, similar to the group-based system using directory services implementation, the number of computers to which the file information are communicated to is reduced.

The multi-level stochastically partitioned database implementation can be employed using any number of levels, and is described herein primarily with reference to a two-level implementation. In a two-level implementation, the number of other computers that each computer has to contact to forward its file information to is proportional to the square root of the system size, while in a three-level implementation the number of computers that each computer has to contact to forward its file information to is proportional to the cube root of the system size. Alternative embodiments may also be used, with the number of computers that each computer has to contact to forward its file information to grows non-polynomially proportionally to the system size (e.g., based on logarithmic growth).

Figure 13:
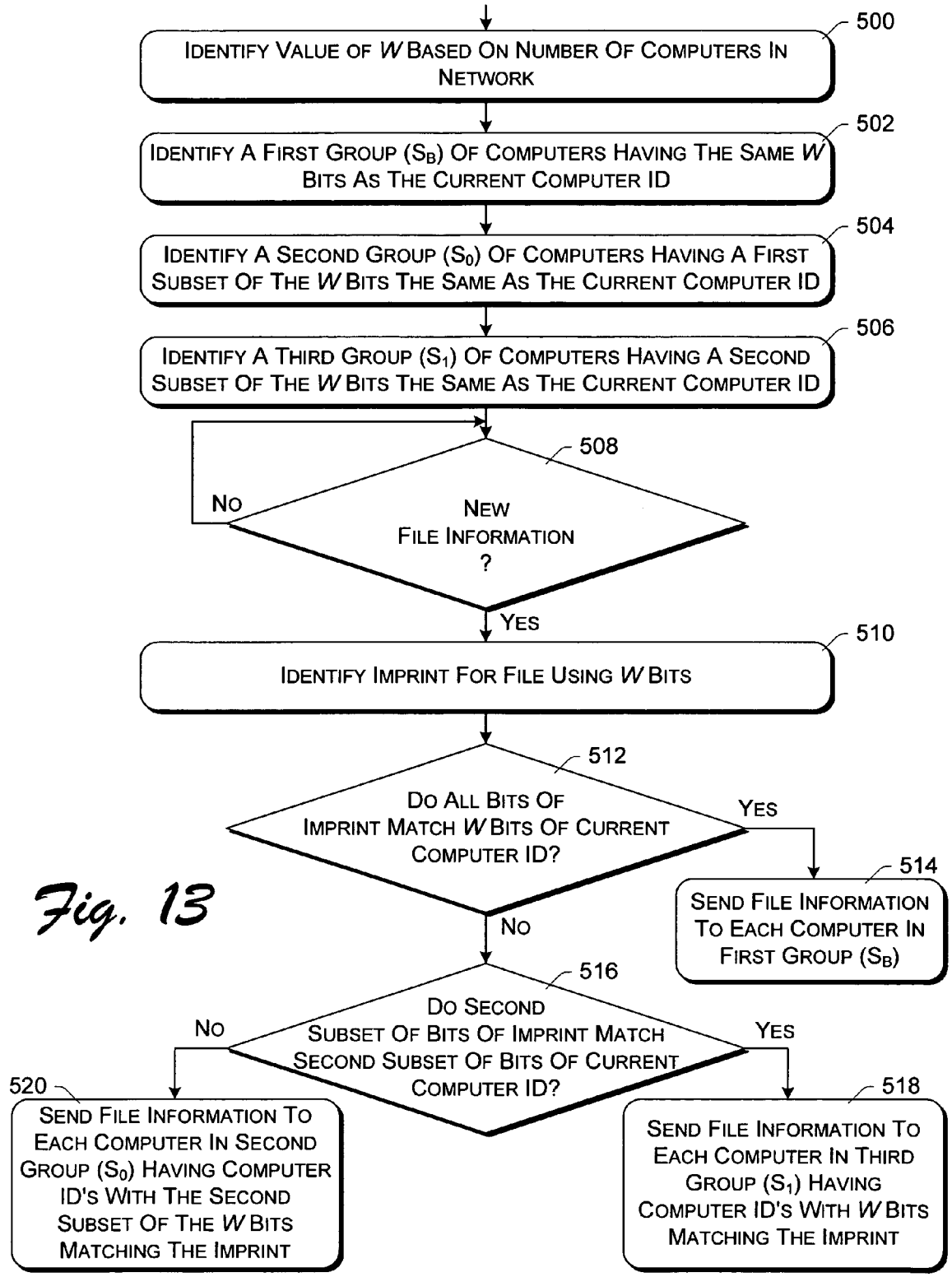
FIG. 13 is a flowchart illustrating an exemplary process followed by each computer for a multi-level stochastically partitioned database implementation in accordance with certain embodiments of the invention.

FIG. 13 is a flowchart illustrating an exemplary process followed by each computer for the multi-level stochastically partitioned database implementation in accordance with certain embodiments of the invention. The process of FIG. 13 is carried out by a computing device 200 of FIG. 2, and may be implemented in software. The process of FIG. 13 is carried out by each computer in the network, and is discussed with reference to a current computer (the computer, as discussed, that is determining to what computer to forward file information).

Initially, a value of W is identified based on the number of computers in the network (act 500), analogous to the discussions above regarding the fully distributed stochastically partitioned database implementation. A first group of computers, referred to as the group $S_B$ is identified as the computers having the same W bits as the current computer ID (act 502). This group $S_B$ thus includes the current computer. A second group of computers, referred to as the group $S_0$ is identified as the computers having a first subset of the W bits the same as the current computer ID (act 504). In one implementation, the first subset of the W bits are the even bits of the W bits. This first subset can vary (e.g., it may be the odd bits, or in a three-level implementation two out of every three bits starting with bit zero, etc.). A third group of computers, referred to as the group $S_1$ is identified as the computers having a second subset of the W bits the same as the current computer ID (act 506). This second subset can also vary, but is different than the first subset (e.g., it may be the even bits, or in a three-level implementation two out of every three bits starting with bit one, etc.). Although only three groups are illustrated as being identified in FIG. 13, additional groups are created for each additional level in the implementation, and the computers in those groups identified in an analogous manner. For example, in a three-level implementation a fourth level is identified based on a third subset of the W bits (e.g., the computers having two out of every three bits of the W bits starting with bit two the same as the current computer ID).

These identified groups are then used in determining, for each file information being analyzed by the current computer, to which computers to send the file information. Each file information being analyzed by the current computer may have been generated at the current computer, or alternatively may have been generated at another computer and transferred to the current computer. The computer then waits for new file information that needs to be analyzed (act 508). The groups identified in acts 502-506 may take on new members as new machines are added to the system, or they may lose members as machines are removed from the system, but otherwise they remain the same until the number of computers in the network changes sufficiently to alter the value of W. When this occurs, acts 502-506 are repeated to re-identify the groups.

Eventually, new file information is received, and an imprint for the file is identified (act 510), analogous to the discussions above regarding the fully distributed stochastically partitioned database implementation. The current computer then checks whether all the bits of the imprint match (are the same as) the W bits of the current computer ID (act 512). If all the bits do match, then the file information is transferred to each computer in the first group, group $S_B$, (act 514). However, if all the bits do not match, then a check is made as to whether the second subset of bits of the imprint match (are the same as) the second subset of bits of the current computer ID (act 516). If the second subsets do match then the file information is transferred to each computer in the third group, group $S_1$, having computer ID's with their W bits matching (the same as) the imprint (act 518). However, if the second subsets do not match, then the file information is transferred to each computer in the second group, group $S_0$, having computer ID's with the second subset of their W bits matching (the same as) the imprint (act 520).

Although the decision of to which group of computers to send the file information is based on two subsets of bits in acts 512-520, alternatively an additional subset of bits is analyzed for each additional level in the implementation. For example, in a three-level implementation a third subset of bits is analyzed if the second subsets of bits of the imprint do not match the second subset of bits of the current computer ID in act 516. Based on this third set of bits, then, the file information is either sent to selected computers in the fourth group, or to selected computers in the second group.

An exemplary process carried out by the current computer in determining to which computer(s) to forward its file information is described in more detail as follows. Initially, the value of W is calculated as discussed above:

$$W = \left\lfloor \lg \frac{M}{R} \right\rfloor$$

Two additional values, $W_0$ and $W_1$ are then calculated based on W as follows:

$$W_0 = \left\lceil \frac{W}{2} \right\rceil \quad W_1 = \left\lfloor \frac{W}{2} \right\rfloor$$

The ceiling brackets indicate that $W_0$ is set to the smallest integer that is no less than W/2, and the floor brackets indicate that $W_1$ is set to the largest integer that is no greater than W/2. The current computer then calculates two bit masks: $\psi_0$ which is a sequence of $W_0$ copies of the bit string "01", and $\psi_1$ which is a sequence of $W_1$ copies of the bit string "10". These can be illustrated as follows:

$$\psi_0 = \sum_{k=0}^{W_0-1} 2^{2k} \quad \psi_1 = \sum_{k=0}^{W_1-1} 2^{2k+1}$$

When the current computer becomes aware of a new computer in the network, the current computer may or may not remember the new computer's ID. If the current computer does decide to remember the new computer's ID, it assigns the new computer into a particular group. Whether to remember the new computer's ID, as well as to which group to assign the new computer, is determined according to the following pseudocode (where "&" refers to bitwise conjunction, "==" refers to "is equal to", $CID_{new}$ refers to the W bits of the computer ID of the new computer, and $CID_{me}$ refers to the W bits of the computer ID of the current computer).

```
if (CID_new & ψ_0) == (CID_me & ψ_0) and (CID_new & ψ_1) == (CID_me & ψ_1)
    add new computer to set S_B;
else if (CID_new & ψ_0) == (CID_me & ψ_0)
    add new computer to set S_0;
else if (CID_new & ψ_1) == (CID_me & ψ_1)
    add new computer to set S_1;
else
    forget new computer;
```

When new file information is identified (based on either a file stored at the current computer or file information received from another computer in the network), the current computer determines what to do with the file information based on the following pseudocode. In the following pseudocode, "==" refers to "is equal to", "!=" refers to "is not equal to", "&" refers to bitwise conjunction, "information" refers to the new file information, $CID_{recipient}$ refers to the W bits of the computer ID of a computer that is a potential recipient of the new file information, and $CID_{me}$ refers to the W bits of the computer ID of the current computer.

```
if (information & ψ_1) != (CID_me & ψ_1)
    send information to every computer in S_0 for which
        (information & ψ_1) == (CID_recipient & ψ_1);
else if (information & ψ_0) != (CID_me & ψ_0)
    send information to every computer in S_1 for which
        (information & ψ_0) == (CID_recipient & ψ_0);
else {
    if information originated from current computer
        send information to every computer in S_B;
    store information in database of current computer;
    check database for matching information;
    notify pairs of computers with matching information;
}
```

Figure 14:
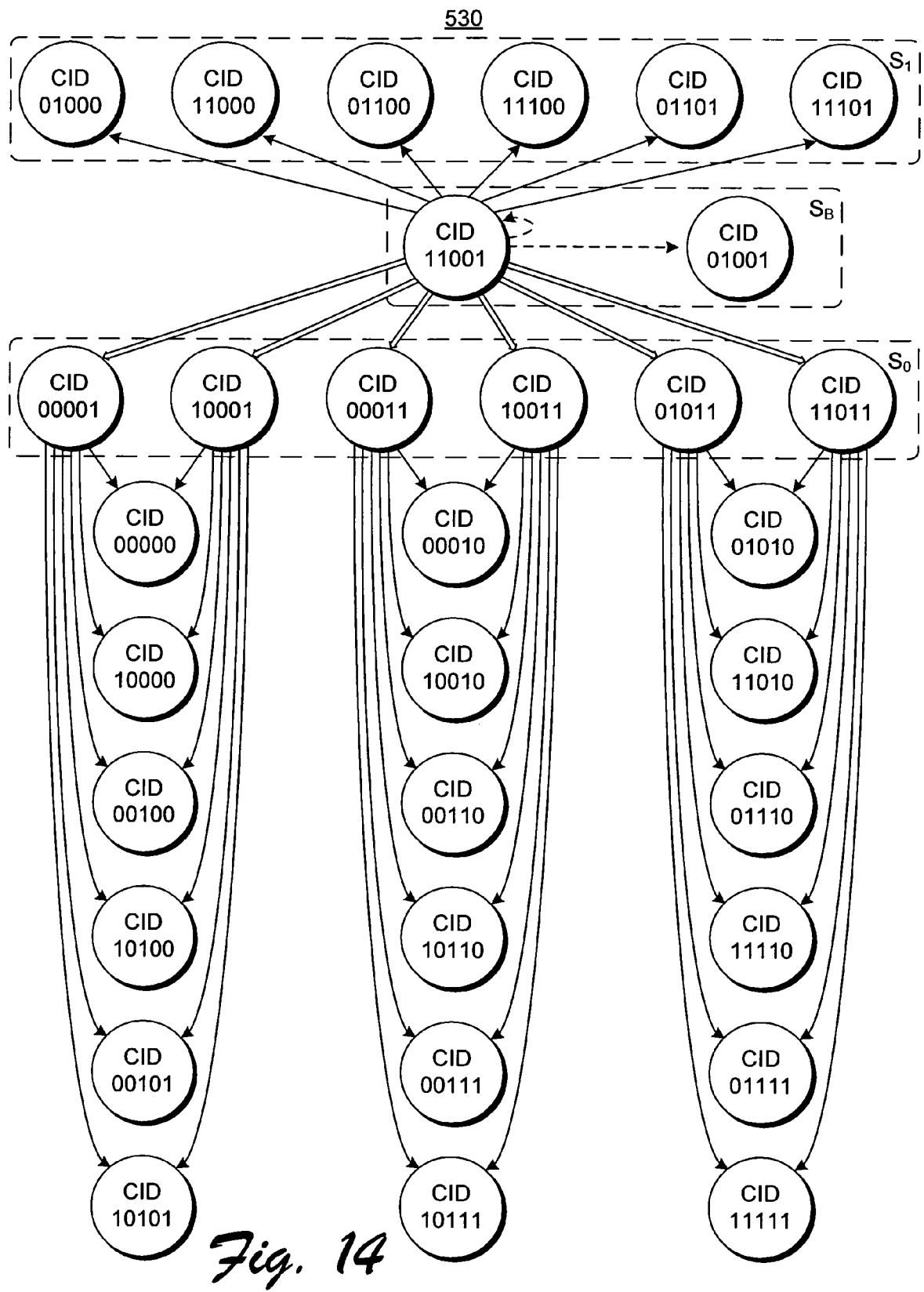
FIG. 14 illustrates an exemplary network in which a multi-level stochastically partitioned database implementation is employed.

FIG. 14 illustrates an exemplary network 530 in which the multi-level stochastically partitioned database implementation is employed. The example network 530 includes only 32 computers for ease of explanation and to avoid cluttering the drawings. Additionally, only the five least significant bits of the computer ID (CID) for each computer is illustrated in FIG. 14.

FIG. 14 illustrates a two-level stochastically partitioned database described from the point of view of computer CID 11001. Assume, for the purposes of discussion of FIG. 14, that R=2 and the following values have been computed: W=4, $W_0$=2, $W_1$=2, $\psi_0$=0101, and $\psi_1$=1010. Based on these values, and the computer ID's illustrated in FIG. 14, computer CID 11001 groups selected machines into three groups as follows. Group $S_B$ includes computer CID 01001. Group $S_0$ includes the following computers: CID 00001, CID 00011, CID 01011, CID 10001, CID 10011, and CID 11011. Group $S_1$ includes the following computers: CID 01000, CID 01100, CID 01101, CID 11000, CID 11100, and CID 11101.

When new file information is identified, computer CID 11001 identifies the W (4 in this example) least significant bits of the file information. If the four least significant bits of the file information are "1001", then the file information is stored in the database of computer CID 11001. The file information is also forwarded to other computers in group $S_B$ (computer CID 01001), which also store the file information in their databases. The transfers to computers in group $S_B$ are referred to as "zero-hop" transfers, and are illustrated by the dashed line from computer CID 11001 to computer CID 01001.

If the four least significant bits of the file information are "1x0y" for any single-bit values of x and y other than (x,y)=(0,1), then the file information is sent to computers in group $S_1$ having CID's that are "01x0y" or ""11x0y". Upon receipt of the file information, these computers in group $S_1$ will have the same four least significant bits of their CIDs matching the four least significant bits of the file information, so these computers will store the received file information in their respective databases. The transfers to computers in group $S_1$ are referred to as "single-hop" transfers, and are illustrated by the single solid lines from computer CID 11001 to the computers in $S_1$.

If the four least significant bits of the file information are "wxyz" for any single-bit values of w, x, y and z other than (w,y)=(1,0), then the file information is sent to computers in group $S_0$ having CID's that are "0w0y1" and "1w0y1". Upon receipt of the file information, these computers in group $S_0$ will either store the file information in their respective databases, or forward the file information on to another computer. If (x,z)=(0,1) then the four least significant bits of computers having CIDs "0w0y1" and "1w0y1" will match the four least significant bits of the file information, so these computers will store the file information in their respective databases. However, if (x,z)≠(0,1) then the computers with CIDs "0w0y1" and "1w0y1" will forward the file information to computers "0wxyz" an "1wxyz", which will in turn store the file information in their respective databases. The transfer to computers in group $S_0$ are referred to as "double-hop" transfers because they may require a second transfer before reaching an appropriate database. These transfers are illustrated by the double solid lines from computer CID 11001 to the computers in $S_0$.

Example Computer System

Figure 15:
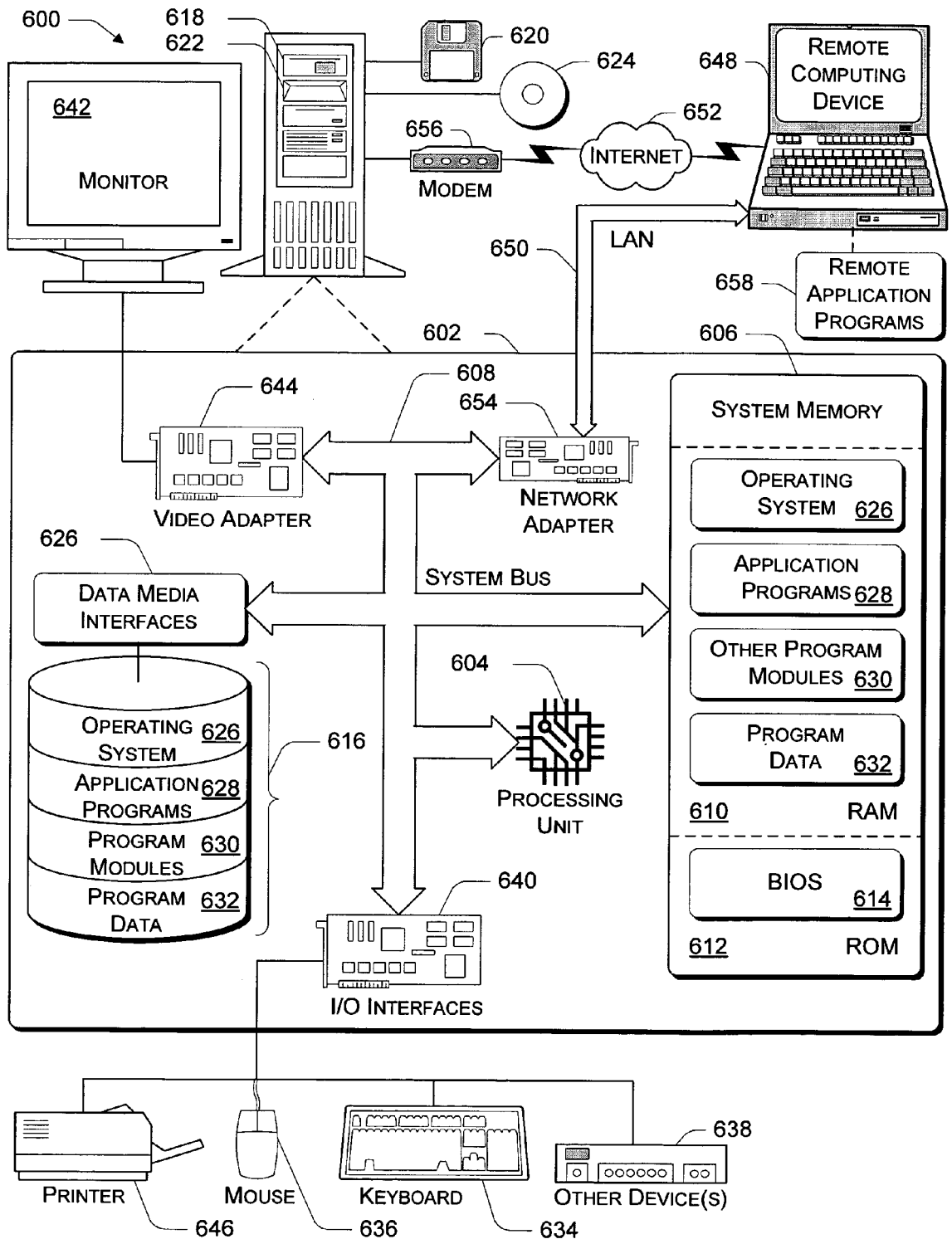
FIG. 15 illustrates a more general exemplary computer environment which can be used in various embodiments of the invention.

FIG. 15 illustrates a more general exemplary computer environment 600, which can be used in various embodiments of the invention. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the exemplary computer environment 600.

Computer environment 600 includes a general-purpose computing device in the form of a computer 602. Computer 602 can be, for example, any of computing devices 102-108 of FIG. 1, or a computing device 200 of FIG. 2. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 15 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Computer 602 typically includes at least some form of computer readable media. Computer readable media can be any available media that can be accessed by computer 602. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 602. Communication media typically embodies computer readable instructions, data structures, program modules or other data in a modulated data is signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described herein in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

It should be noted that, although discussed primarily herein with reference to a serverless distributed file system, the invention can be used in any file system in which it is desired to identify identical files across multiple computers. Thus, the invention can be used in other embodiments, such as, for example, those with one or more centralized file servers.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method of locating potentially identical objects across multiple computers based on stochastic partitioning of workload, the method comprising:

generating object information by an information generation unit of a computing device, the object information being identified as an imprint by a pre-calculated number of bits of object information;

selecting, by the information generation unit of a computing device, for each of a plurality of objects stored on a plurality of computers in a network, an imprint corresponding to the object;

using a stochastic partitioning process by a forwarding location determination unit of a computing device to identify which of the plurality of computers to communicate the object information to for identification of potentially identical objects on the plurality of computers, the stochastic partitioning process comprising:

comparing, for each of the plurality of computers, the imprint to a portion of a computer identifier associated with the computer;

identifying which of the computer identifiers have portions matching the imprint; and communicating the object information to each of the computers associated with a computer identifier having a portion matching the imprint.

2. A method as recited in claim 1, wherein the object information comprises file information and wherein each of the plurality of objects comprises a file in a file system.

3. A method as recited in claim 1, wherein the stochastic partitioning process comprises a fully distributed stochastic partitioning process.

4. A method as recited in claim 1, wherein the stochastic partitioning process comprises a group-based system using directory services process including:

accessing an object information portion to computer mapping on a remote computer; and identifying one or more computers to receive the object information based at least in part on the accessed mapping.

5. A method as recited in claim 1, wherein the stochastic partitioning process comprises a multi-level stochastic partitioning process including:

grouping, into a plurality of groups, selected ones of the plurality of computers, wherein the grouping is based at least in part on the number of the plurality of computers in the network that the computer using the stochastic partitioning process is aware of; and identifying which of the selected ones of the plurality of computers to communicate the object information to, wherein the identifying is based at least in part on comparing the selected portion of the object information to a portion of a computer identifier of one or more of the selected ones of the plurality of computers.

6. One or more computer storage media having stored thereon a plurality of instructions that, when executed by one or more processors of one of a plurality of computers in a network, causes the one or more processors to perform the following acts:

generating a portion of file information by an information generation unit of a computing device, the portion of file information comprising a pre-calculated number of bits of file information;

selecting a portion of file information corresponding to a file, wherein the portion of file information corresponding to the file is utilized in comparing an imprint for computer mapping;

identifying a mapping of the portion of file information to one or more computers by accessing the imprint for computer mapping, wherein the imprint for computer mapping utilizes selected bits of a computer ID of the one or more computers and mapping occurs when the selected bits of the computer ID match the portion of file information; and communicating the file information to each of the identified one or more computers for identification of potentially identical files on the one or more computers.

7. One or more computer storage media as recited in claim 6, wherein the file information is a semi-unique value based at least in part on data in the file.

8. One or more computer storage media as recited in claim 6, wherein the file information is based at least in part on one or more characteristics of the file.

9. One or more computer storage media as recited in claim 6, wherein the size of the portion of the file information is based at least in part on a count of the plurality of computers in the network that the one computer is aware of.

10. One or more computer storage media as recited in claim 6, wherein the size of the portion of the file information is based at least in part on an average number of computers in the network that a particular file identifier should be communicated to.

11. One or more computer storage media as recited in claim 6, wherein the identifying comprises identifying the mapping by accessing a locally stored imprint for computer mapping.

12. One or more computer storage media as recited in claim 6, wherein the identifying comprises identifying the mapping by accessing an imprint to computer mapping stored at another computer.

13. A system comprising:

a processing unit;

a memory, coupled to the processing unit facilitating operation of:

an interface configured to allow the system to communicate with a plurality of other computers;

an information generation unit configured to generate a portion of object information, the portion of object information comprising a pre-calculated number bits of file information;

a file information comparison module configured to select a portion of file information corresponding to a file, wherein the portion of file information corresponding to the file is utilized in comparing an imprint for computer mapping; and a forwarding location determination module, coupled to the interface, configured to identify one or more of the plurality of other computers to communicate file information corresponding to a file to for identification of potentially identical files stored on the plurality of other computers by accessing a mapping of a portion of the file information to one or more of a plurality of other computers.

14. A system as recited in claim 13, wherein the file information is a semi-unique value based at least in part on the data in the file.

15. A system as recited in claim 13, wherein the size of the portion of the file information is based at least in part on a count of computers coupled to the system that the system is aware of.

16. A system as recited in claim 13, further comprising a locally stored imprint to computer mapping, and wherein the forwarding location determination module is configured to identify the one or more of a plurality of other computers to communicate the file information to by accessing the locally stored imprint to computer mapping.

17. A system as recited in claim 13, wherein the forwarding location determination module is configured to identify the one or more of a plurality of other computers to communicate the file information to by accessing an imprint for computer mapping stored at another computer.

* * * * *

UNITED STATES PATENT AND TRADEMARK OFFICE
CERTIFICATE OF CORRECTION

PATENT NO. : 7,509,423 B2
APPLICATION NO. : 10/992024
DATED : March 24, 2009
INVENTOR(S) : John R. Douceur et al.

It is certified that error appears in the above-identified patent and that said Letters Patent is hereby corrected as shown below:

In Face page, in field (75), under "Inventors" column 1, line 3, delete "Atul Adya, Bellevue" and insert -- Atul Adya, Redmond --, therefor.

Signed and Sealed this
Third Day of May, 2011

David J. Kappos
*Director of the United States Patent and Trademark Office*